United States Patent
Tare et al.

(10) Patent No.: US 9,521,066 B2
(45) Date of Patent: Dec. 13, 2016

(54) VSTACK ENHANCEMENTS FOR PATH CALCULATIONS

(71) Applicant: VSS Monitoring, Inc., Sunnyvale, CA (US)

(72) Inventors: Amita G. Tare, San Jose, CA (US); Amal Khursheed, Delhi (IN); Sharadaa Srinivasan, Saratoga, CA (US)

(73) Assignee: VSS Monitoring, Inc., Sunnyvale, CA (US)

( * ) Notice: Subject to any disclaimer, the term of this patent is extended or adjusted under 35 U.S.C. 154(b) by 67 days.

(21) Appl. No.: 14/611,889

(22) Filed: Feb. 2, 2015

(65) Prior Publication Data

US 2016/0226746 A1   Aug. 4, 2016

(51) Int. Cl.
*G01R 31/08* (2006.01)
*G06F 11/00* (2006.01)
*H04J 1/16* (2006.01)
*H04L 12/751* (2013.01)
*H04L 12/721* (2013.01)

(52) U.S. Cl.
CPC ............. *H04L 45/02* (2013.01); *H04L 45/123* (2013.01)

(58) Field of Classification Search
CPC .................................................... H04L 43/028
See application file for complete search history.

(56) References Cited

U.S. PATENT DOCUMENTS

| | | | | |
|---|---|---|---|---|
| 8,018,943 B1* | 9/2011 | Pleshek | ................. | H04L 43/028 370/254 |
| 8,559,334 B2* | 10/2013 | Iovanna | ................. | H04L 45/02 370/254 |
| 2011/0142056 A1* | 6/2011 | Manoj | ..................... | H04L 45/00 370/400 |

* cited by examiner

*Primary Examiner* — Maharishi Khirodhar
(74) *Attorney, Agent, or Firm* — Locke Lord LLP; Scott D. Wofsy; Christopher J. Capelli

(57) ABSTRACT

A network captured traffic distribution device is provided. The network captured traffic distribution device includes a stacking port configured to enable the stacking of the network captured traffic distribution device with at least one additional network captured traffic distribution device in a stacked topology. The network captured traffic distribution device further includes a processor configured to determine a target destination of a received traffic flow of captured data packets. The processor is further configured to determine a plurality of routes through the stacked topology from the network captured traffic distribution device to the target destination. The processor is further configured to determine an amount of available filtering capacity associated with each network captured traffic distribution device along each of the plurality of determined routes. The processor is further configured to select an optimum route from the plurality of determined routes based on the determined amounts of available filtering capacity.

11 Claims, 25 Drawing Sheets

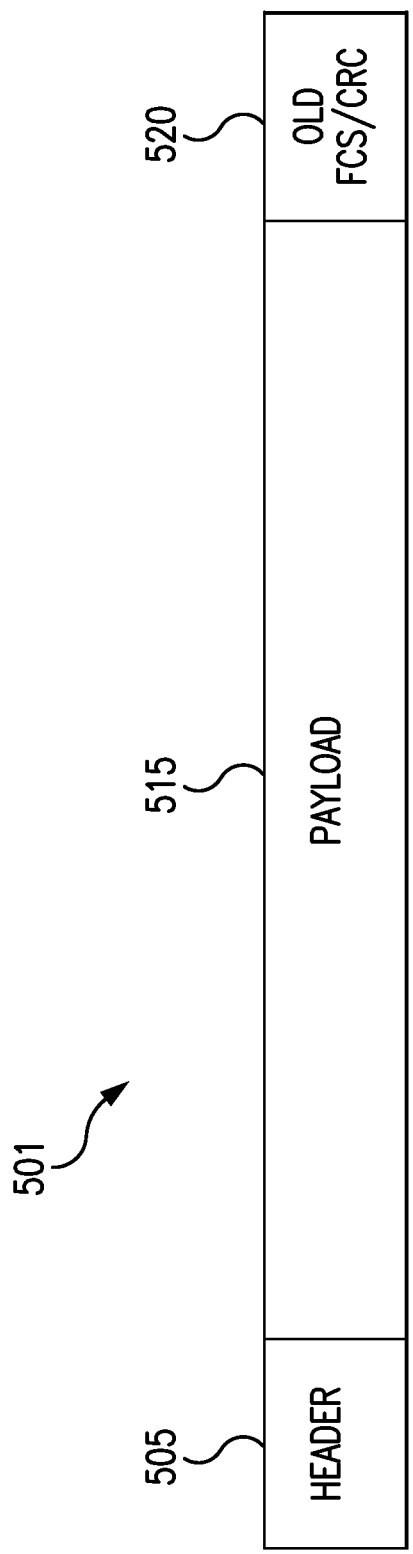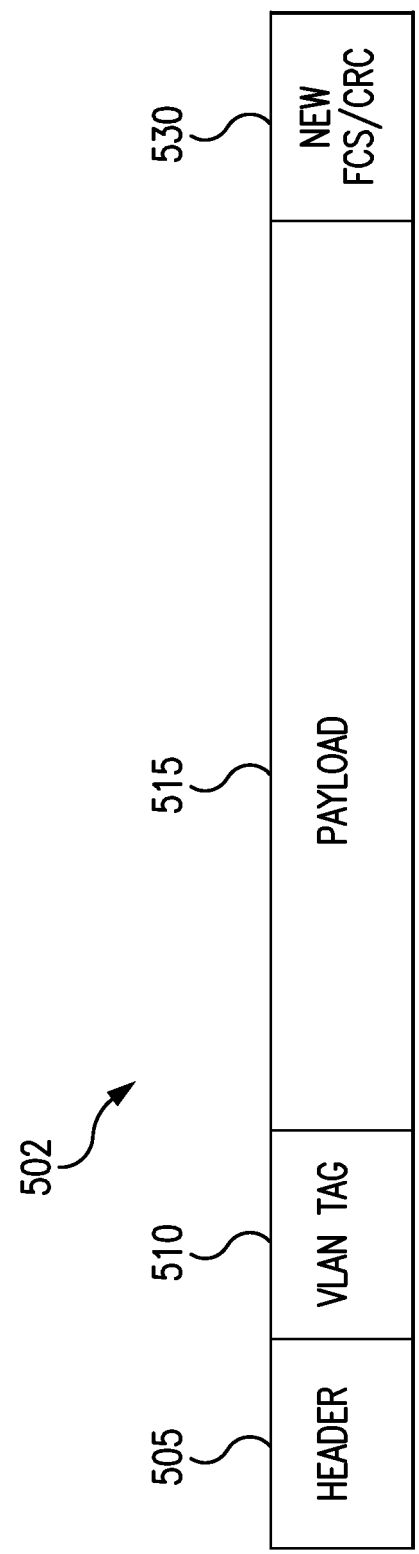

FILTER MATRIX

1320

1322 1324 1326

| Device | Max | Total Used |
|---|---|---|
| 1002 | 24K(12K per ARAD) | 5K |
| 1014 | 2K | 1K |
| 1016 | 2K | 2K |
| 1008 | 2K | 1.5K |
| 1018 | 3K | 3K |
| 1012 | 24K(12K per ARAD) | 9.5K |
| 1006 | 2K | 2K |
| 1004 | 2K | 1K |
| 1020 | 360K(12K per ARAD) | 92K |

Ingress
Transit
Egress

FIG. 13

VSTACK ENHANCEMENTS FOR PATH CALCULATIONS

FIELD OF THE INVENTION

The present invention relates to techniques for determining an optimum route for the transmission of a traffic flow of captured data packets and, more particularly, relates to enhancements for path calculations through a stacked topology of network captured traffic distribution devices to a target destination.

BACKGROUND OF THE INVENTION

Traditionally, intelligent stacking technology for distributed traffic capture devices brings scalability, speed and fault tolerance to centralized network monitoring. Network traffic captured in distributed way requires a scalable centralized layer between network infrastructure and analytical equipment. This architecture creates a single logical traffic capture layer that automatically discovers and routes traffic to the designated monitoring tool via the highest-speed link and the lowest number of hops, changing the path as needed in event of link failure or reconfiguration.

One drawback of existing intelligent stacking technology is that various network capture devices included in the single logical traffic capture layer typically not only have different port speeds but also limited filtering resources. However, optimum path selection techniques employed by existing centralized network capture systems take into account only variable link speeds.

SUMMARY OF THE INVENTION

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a network captured traffic distribution device is provided. The network captured traffic distribution device includes a plurality of bi-directional ports configured to perform at least one of receiving captured network traffic and echoing received captured network traffic to one or more of the plurality of bi-directional ports. The network captured traffic distribution device further includes a stacking port configured to enable, via a communication link, the stacking of the network captured traffic distribution device with at least one additional network captured traffic distribution device in a stacked topology. The stacking includes an exchange of configuration information between the network captured traffic distribution device and the at least one additional network captured traffic distribution device. The network captured traffic distribution device further includes a processor configured to determine a target destination of a received traffic flow of captured data packets. The processor is further configured to determine a plurality of routes through the stacked topology from the network captured traffic distribution device to the target destination. The processor is further configured to determine an amount of available filtering capacity associated with each network captured traffic distribution device along each of the plurality of determined routes. The processor is further configured to select an optimum route from the plurality of determined routes based on the determined amounts of available filtering capacity.

In another aspect, a computer program product for selecting an optimum route for the transmission of a traffic flow of captured data packets is provided. The computer program product includes one or more computer-readable storage devices and a plurality of program instructions stored on at least one of the one or more computer-readable storage devices. The plurality of program instructions includes program instructions to determine a target destination of a captured traffic flow received by a network captured traffic distribution device communicatively coupled to a topology of stacked network captured traffic distribution devices. The plurality of program instructions further includes program instructions to determine a plurality of routes through the stacked topology from the network captured traffic distribution device to the target destination. The plurality of program instructions further includes program instructions to determine an amount of available filtering capacity associated with each network captured traffic distribution device along each of the plurality of determined routes. The plurality of program instructions further includes program instructions to select an optimum route through the stacked topology from the plurality of determined routes based on the determined amounts of available filtering capacity.

BRIEF DESCRIPTION OF THE DRAWINGS

The accompanying appendices and/or drawings illustrate various, non-limiting, examples, inventive aspects in accordance with the present disclosure:

FIGS. 5A and 5B are diagrams illustrating exemplary data packets, in accordance with an embodiment of the present invention;

FIG. 13 illustrates an exemplary filter matrix generated for the scenario depicted in FIGS. 10A-10E, in accordance with an embodiment of the present invention.

DETAILED DESCRIPTION OF CERTAIN EMBODIMENTS

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below.

Figure 1A:
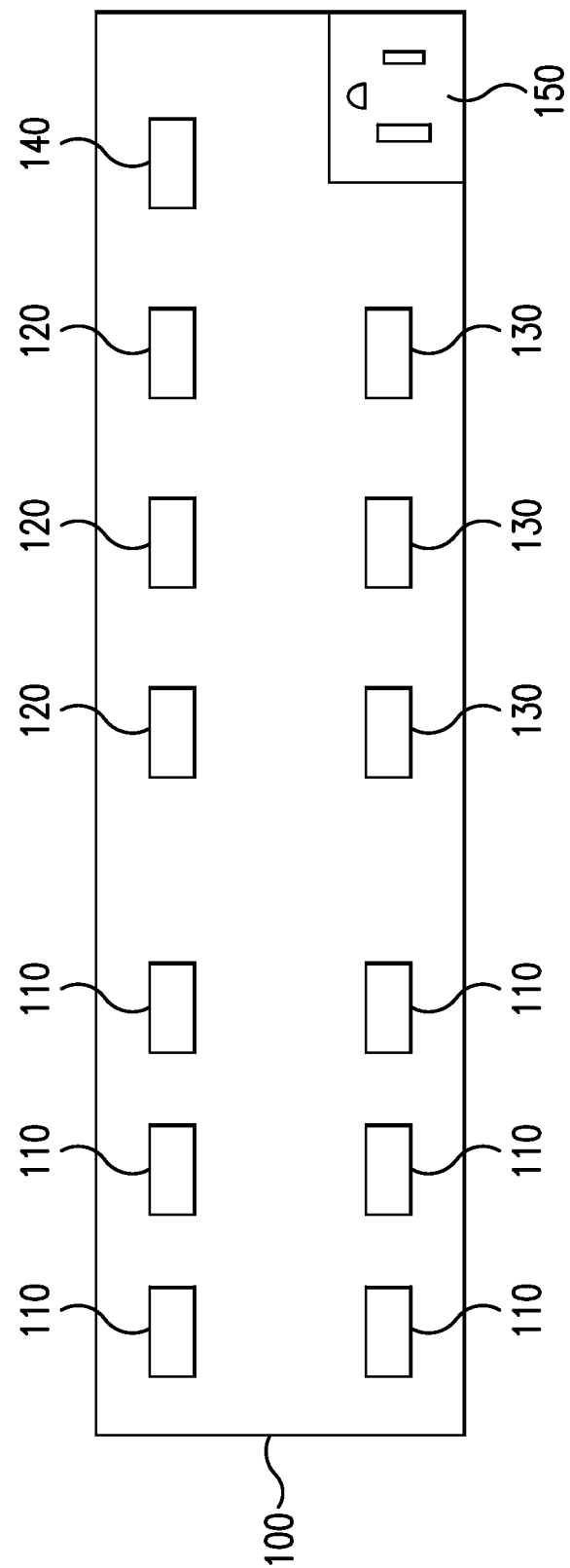
FIG. 1A is a block diagram illustrating an exemplary network captured traffic distribution device, in accordance with an embodiment of the present invention.

Turning now descriptively to the drawings, in which similar reference characters denote similar elements throughout the several views, FIG. 1A is a block diagram illustrating an exemplary network captured traffic distribution device, in accordance with an embodiment of the present invention. Network capture traffic distribution device 100 may include a plurality of bidirectional ports 110, a plurality of egress ports 120, a plurality of stacking 130 ports, a management port 140, and a power input 150

Bidirectional ports 110 may be connected, via a communication link, to one or more sources of captured network traffic and may be compatible with, for example, a copper cable, a 10/100 Ethernet cable, a 1 gigabit (Gb) Ethernet cable, a 10 Gb Ethernet cable, a 40 Gb Ethernet cable, a 100 Gb Ethernet cable, a fiber optic cable and/or any combination thereof. Egress port 120 may be coupled to one or more external devices such as a monitoring device, a network analyzing device, a communication device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, a telecommunications analyzer, and a forensic analyzer via a communication link such as a copper cable, a 10/100 Ethernet cable, a 1 Gb Ethernet cable, a 10 Gb Ethernet cable, a 40 Gb Ethernet cable, a 100 Gb Ethernet cable, a fiber optic cable and/or any combination thereof. On some occasions, one or more egress ports 120 may be configured as a monitor port or network analyzer port such that it is compatible with, for example, one or more external network monitor or analysis devices. In some cases, information associated with bidirectional ports 110 and/or egress ports 120 may be provided to a user and/or administrator via a user interface such as a graphic user interface (GUI).

Stacking ports 130 may enable the stacking of network captured traffic distribution device 100 with one or more additional network captured traffic distribution devices arranged in a stacked topology. Stacking a network captured traffic distribution device may include, but is not limited to, an exchange of data and configuration information between two or more communicatively coupled, or stacked, network captured traffic distribution devices. Stacking port 130 may be compatible with, for example, a copper cable, a 10/100 Ethernet cable, a 1 Gb Ethernet cable, a 10 Gb Ethernet cable, a 40 Gb Ethernet cable, a 100 Gb Ethernet cable, a fiber optic cable, and/or any combination thereof. In some embodiments, stacking ports 130 may be similar to egress ports 120.

Power input 150 may be any appropriate device via which electrical power may be supplied to network captured traffic distribution device 100 such as, but not limited to, an electric plug or an electric cable that may be coupled to a conventional electric wall outlet.

Network captured traffic distribution device 100 may be coupled to one or more networks such as a telecommunications network, a carrier Ethernet network, a voice over Internet protocol (VoIP) network, the Internet, a local area network (LAN), and/or a wireless LAN (WLAN) via one or more bidirectional ports 110 and/or egress ports 120.

Management port 140 may be coupled directly and/or indirectly to a user and/or administrator (i.e., a device accessible to/employed by such an individual) of network captured traffic distribution device 100 and/or a stacked topology of which network captured traffic distribution device 100 is a member. Instructions and/or information may be received by network captured traffic distribution device 100 via management port 140. Additionally or alternatively, configuration information associated with network captured traffic distribution device 100 and/or one or more functions performed by network captured traffic distribution device 100 may be accessed or managed via a GUI.

Figure 1B:
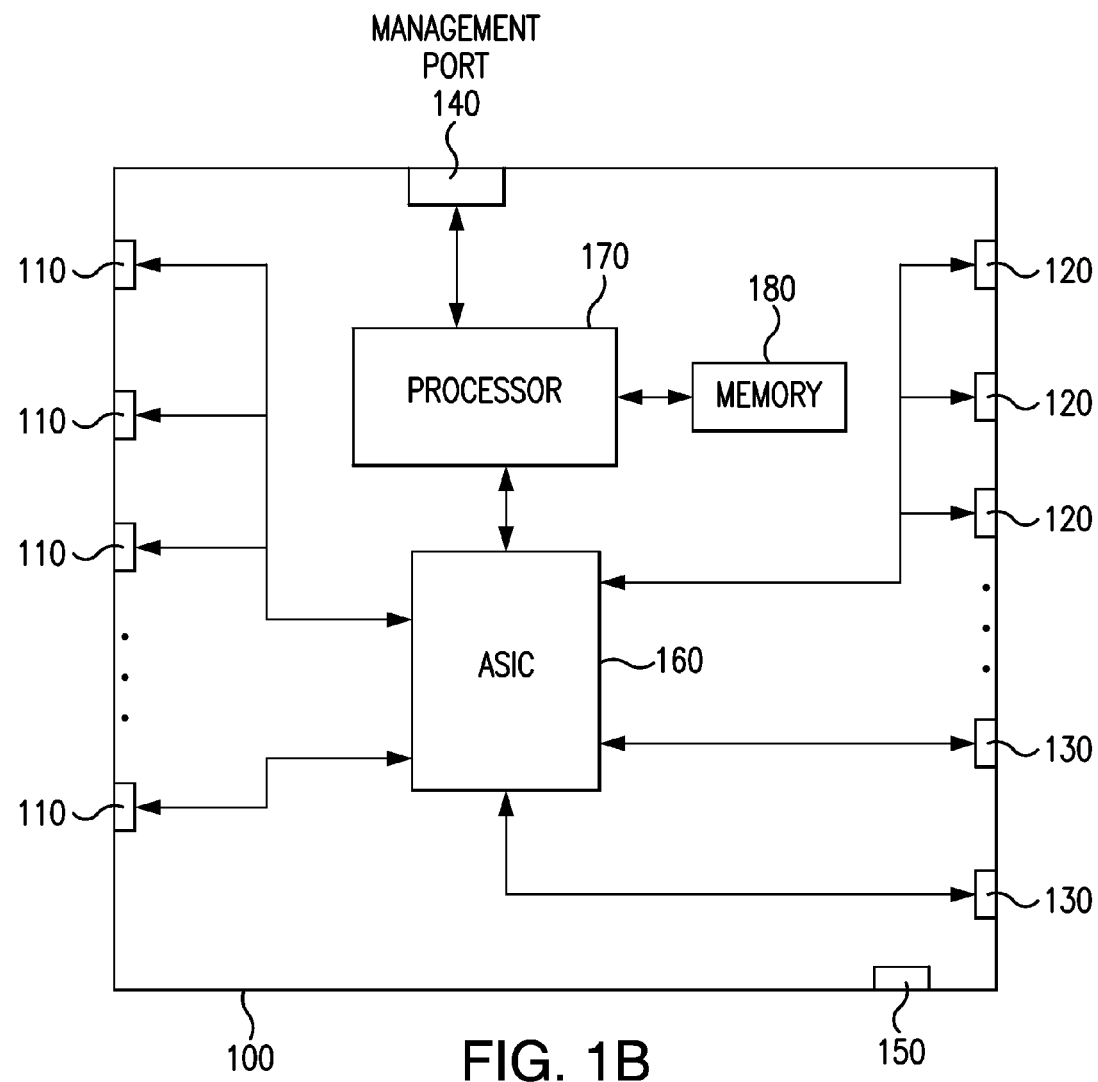
FIG. 1B is a block diagram further illustrating an exemplary network captured traffic distribution device, in accordance with an embodiment of the present invention.

FIG. 1B is a block diagram of a network captured traffic distribution device 100 configured in accordance with an embodiment of the present invention. Network captured traffic distribution device 100 includes bidirectional ports 110, management port 140, egress ports 120, stacking ports 130 and power input 150. Bidirectional ports 110 may be connected to an application specific integrated circuit (ASIC) 160. ASIC 160 may be configured to distribute captured network traffic through network captured traffic distribution device 100. In some embodiments, ASIC 160 may be one or more analog or electric field effect transistor switches. ASIC 160 may further be configured to perform one or more switching functions thereby facilitating the switching and/or distribution of captured network traffic through network captured traffic distribution device 100 and/or the echoing of captured network traffic via one or more bidirectional ports 110. ASIC 160 may be coupled to a processor 170. Processor 170 may be any appropriate computer-processing device or devices such as a microprocessor, digital signal processor or similar device.

Processor 170 may be configured (e.g., under the control of suitable computer-executable instructions) to manage the distribution of received captured network traffic through the network captured traffic distribution device 100 and may be coupled to one or more data storage devices or memories 180. Distribution management executed by processor 170 may include, for example, the management of a flow of received captured traffic through network captured traffic distribution device 100 and/or a stacked topology that includes network captured traffic distribution device 100. Optionally, the distribution management may include, for example, determining a target destination for received captured network traffic; pre-calculating at least one route for the transmission of received captured network traffic from network captured traffic distribution device 100, through the stacked topology, to a target destination and determining an optimum route for the transmission of captured network traffic from network captured traffic distribution device 100, through the stacked topology, to a target destination.

The processor 170 may further be configured to enable peer-to-peer communication and/or peer-to-peer management between network captured traffic distribution device 100 and an additional stacked network captured traffic distribution device included in a stacked topology. In some instances, processor 170 may be enabled to manage the distribution of received captured network traffic through a stacked topology of network captured traffic distribution devices.

Memory 180 may be coupled, directly or indirectly, to processor 170 and/or ASIC 160 and may store one or more instructions executable by processor 170 and/or ASIC 160. Memory 180 may be configured to store an Internet protocol (IP) address assigned to network captured traffic distribution device 100. In some embodiments, the IP address assigned to network captured traffic distribution device 100 may be unique for each individual network captured traffic distribution device present in a stacked topology. Memory 180 may further store, for example, configuration information associated with network captured traffic distribution device 100, filtering information related to a plurality of pre-configured and/or customized user-created filters, data regarding captured network traffic received by network captured traffic distribution device 100, and the distribution and/or management of received captured network traffic by network captured traffic distribution device 100.

One or more stacking ports 130 may be configured to enable network captured traffic distribution device 100 to be stacked and/or communicatively coupled to at least one additional network captured traffic distribution device in a stacked topology. Exemplary configurations for stacked topologies include, but are not limited to, a ring topology, a mesh topology, a star topology, a topology of single links, a topology of multiple links, a topology including one or more redundant links, a topology including one or more large capacity network captured traffic distribution devices and/or any combination thereof. In some cases, stacking ports 130 may be configured as a monitoring port and may be compatible with one or more external devices.

When two or more network captured traffic distribution devices 100 are communicatively coupled, or stacked, in a topology, configuration information resident in one or more of network captured traffic distribution devices 100 may be exchanged between the two or more network captured traffic distribution devices 100. Exemplary configuration information may relate to, for example, the operation of the network captured traffic distribution device, the stacked topology, and/or a device or network coupled to the network captured traffic distribution device. For example, configuration information may include operational statistics associated with network captured traffic distribution device 100 such as an available ingress port or egress port transmission speed, a number of Switched Port ANalyzer (SPAN) ports available, filtering capacity information and an indicator of whether network captured traffic distribution device 100 is fully or partially operational.

Optionally, configuration information may also include instructions regarding the determination of a target destination, such as an external device and/or an egress port resident in the network captured traffic distribution device for captured network traffic. On some occasions, configuration may relate to the pre-calculation of at least one route for the transmission of received captured network traffic from a location, such as a source of network captured network traffic, network captured traffic distribution device 100, or a port resident in network captured traffic distribution device 100, through the stacked topology, to a target destination or the retrieval of one or more pre-calculated routes from a data source such as memory 180 or an external device.

Configuration information may also relate to the determining an optimum route for the transmission of captured network traffic through the stacked topology to a target destination, filtering received captured network traffic according to one or more criterion and evaluating current operating conditions of the stacked topology and/or devices coupled to the stacked topology.

Figure 2A:
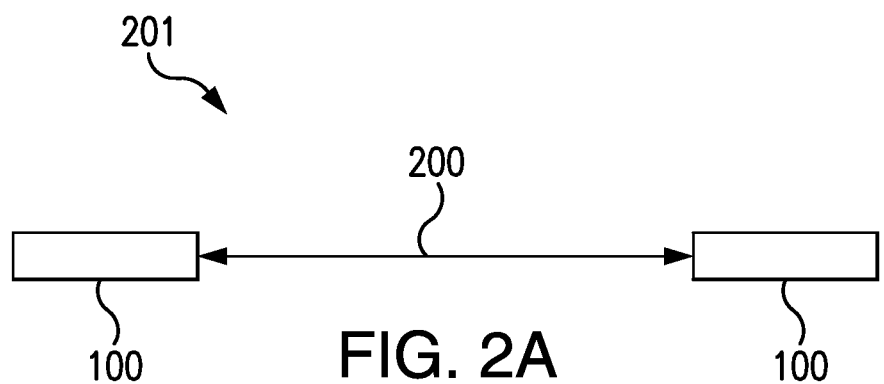
FIGS. 2A-2F are block diagrams depicting exemplary stacked topologies of network captured traffic distribution devices, in accordance with embodiments of the present invention.

FIGS. 2A through 2E are block diagrams illustrating exemplary stacked topologies of network captured traffic distribution devices, like network captured traffic distribution device 100. FIG. 2A illustrates an exemplary stacked topology 201 of two network captured traffic distribution devices 100 communicatively coupled, or stacked, via a communication link 200. Communication link 200 may be wired or wireless and may be enabled to facilitate communication between the network captured traffic distribution devices 100. For example, communication link 200 may be a wireless link capable of transmitting network traffic at a rate of, for example, 1 or 10 Gb/s or a wired link such as a 10/100 Ethernet cable, a 1 Gb Ethernet cable, a 10 Gb Ethernet cable, a 40 Gb Ethernet cable, a 100 Gb Ethernet cable, a copper cable, and/or a fiber cable.

Figure 2B:
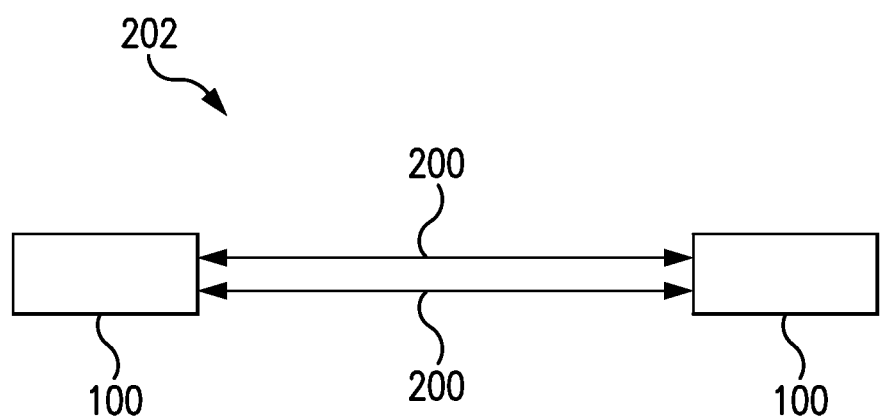

FIG. 2B illustrates an exemplary stacked topology 202 of two network captured traffic distribution devices communicatively coupled via two communication links 200. In stacked topology 202, communication links 200 may link two separate stacking ports resident on each of network captured traffic distribution devices 100 and, on some occasions, communication links 200 may be redundant and/or communication along communication links may be similar or redundant.

Figure 2C:
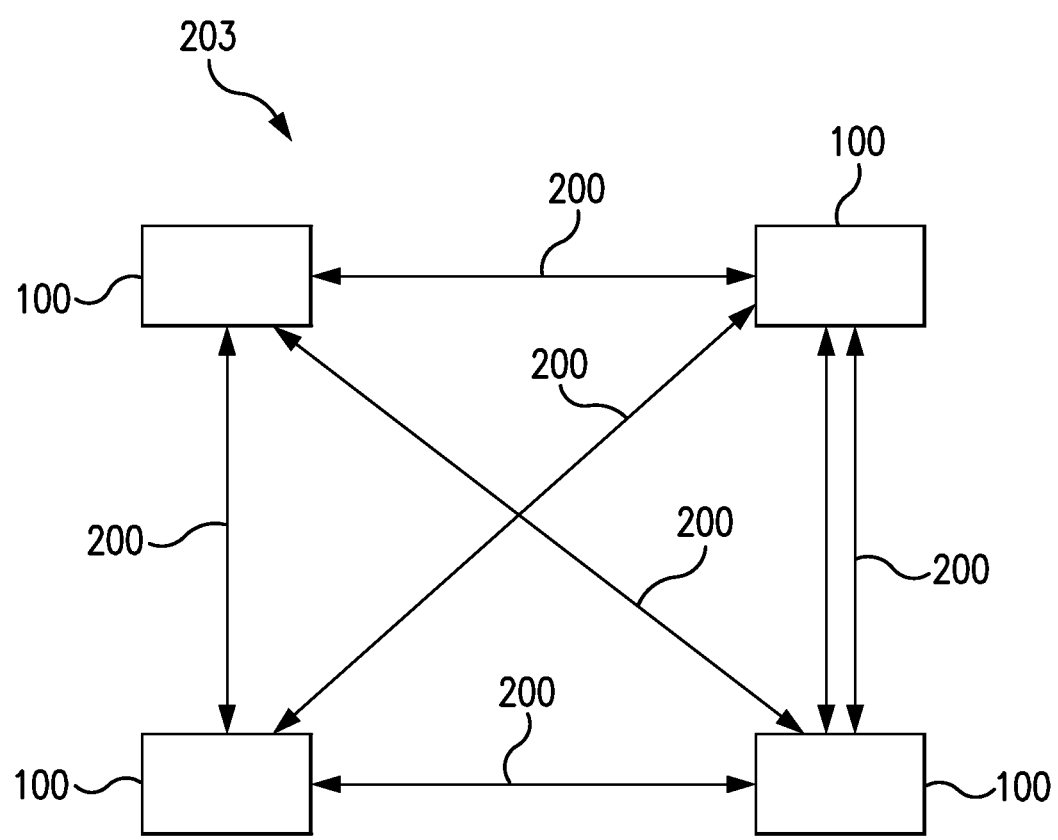

FIG. 2C illustrates network captured traffic distribution devices 100 arranged in an exemplary complex, or mesh, stacked topology 203. Complex, or mesh, stacked topology 203 includes four network captured traffic distribution devices 100 coupled via multiple communication links 200 such that every network captured traffic distribution device 100 is communicatively coupled, directly and/or indirectly, to every other network captured traffic distribution device 100 included in stacked topology 203.

Figure 2D:
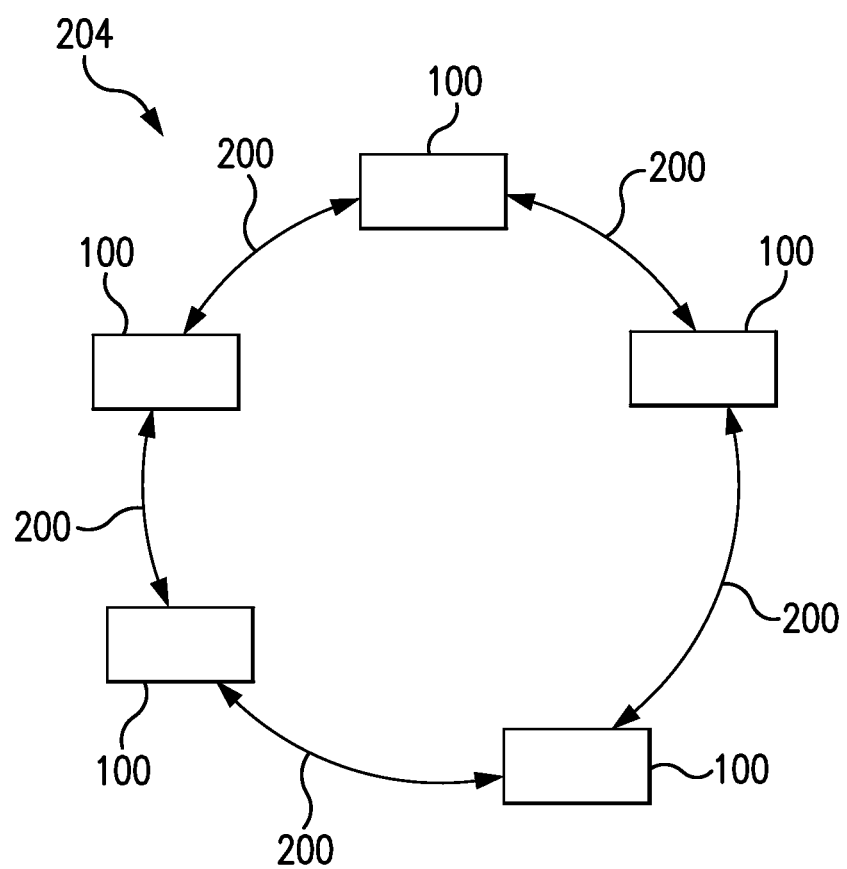

FIG. 2D illustrates an exemplary ring stacked topology 204 wherein five network captured traffic distribution devices 100 are communicatively coupled to one another in a round-robin or ring configuration arrangement via communication links 200.

Figure 2E:
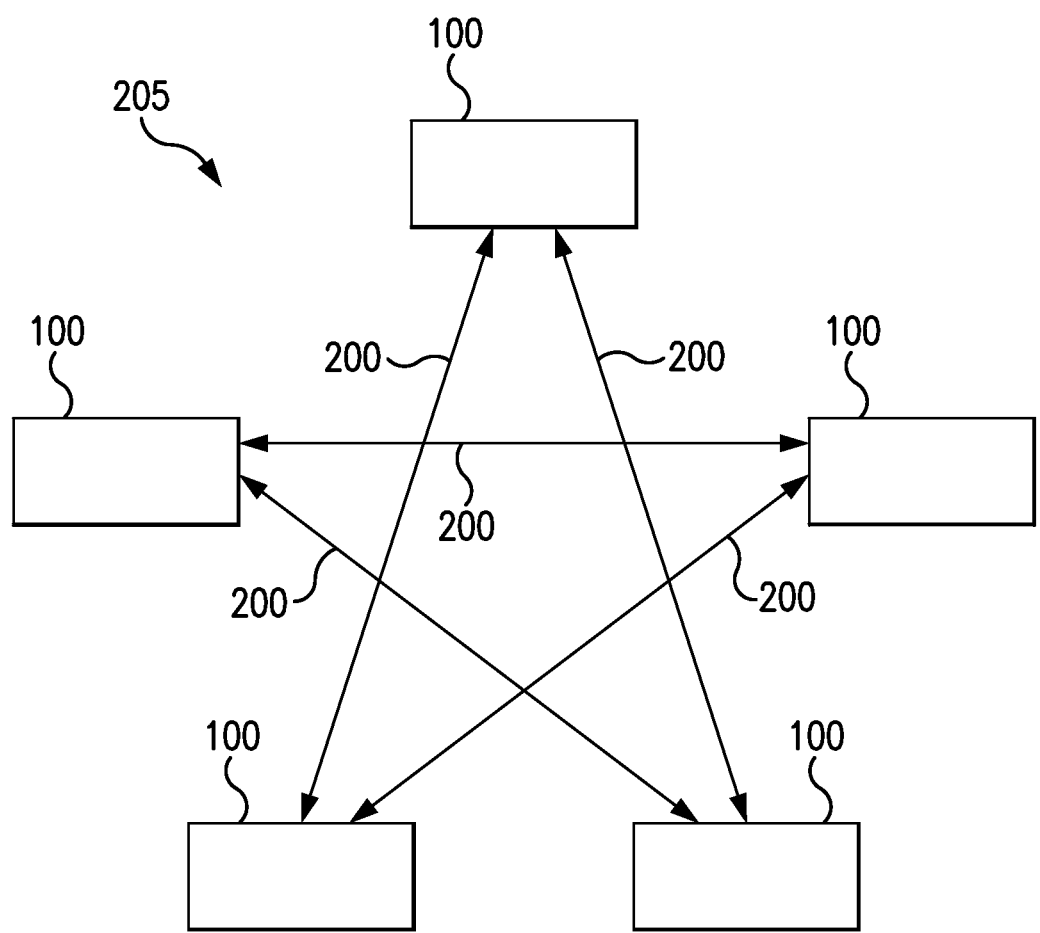

FIG. 2E illustrates an exemplary star stacked topology 205 wherein five network captured traffic distribution devices 100 are communicatively coupled to one another in a star shaped arrangement via communication links 200.

Figure 2F:
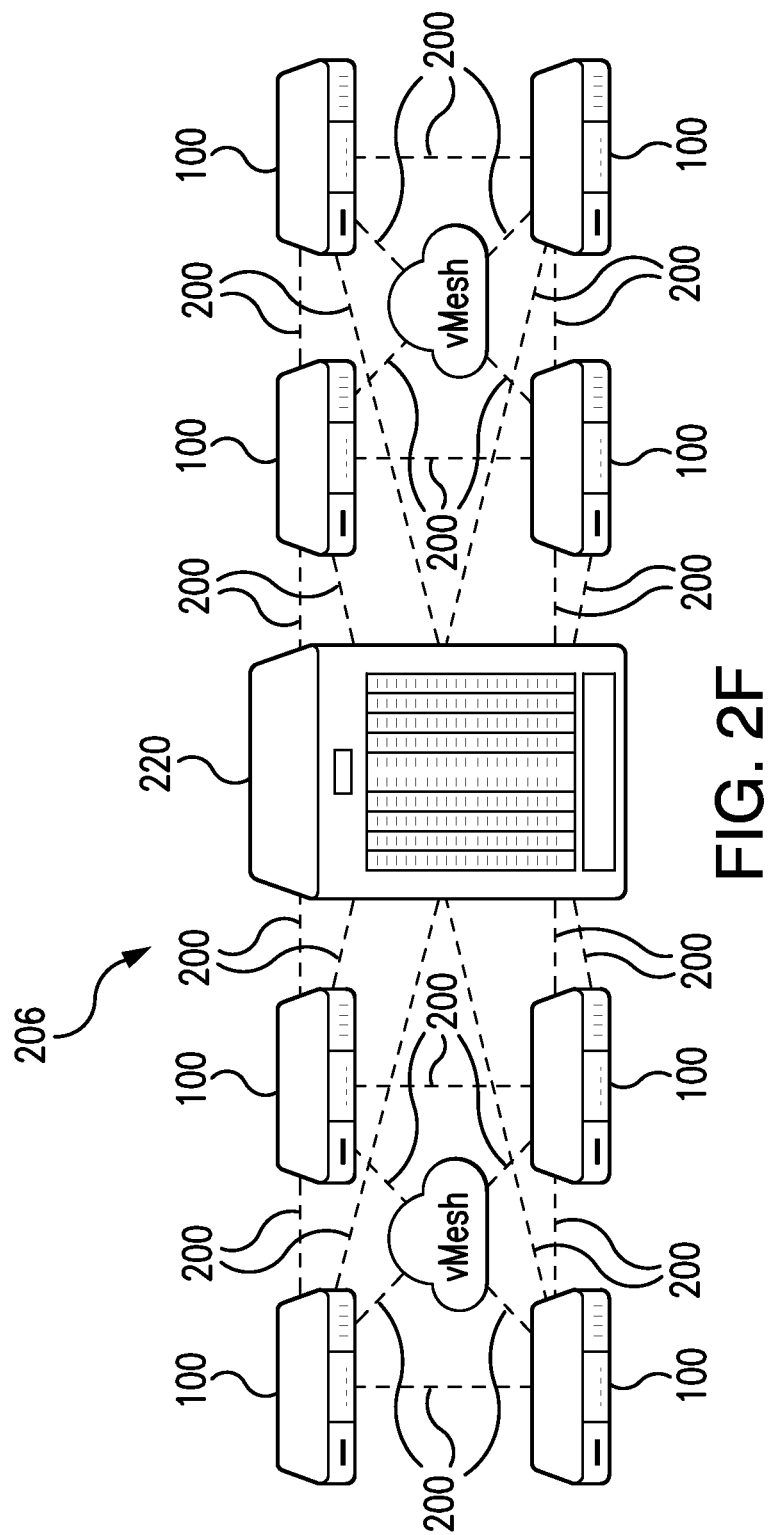

FIG. 2F illustrates an alternative mesh topology 206 including a large capacity device 220. In the depicted mesh topology 206 a plurality of network captured traffic distribution devices 100 are communicatively coupled via multiple communication links 200 such that every network captured traffic distribution device 100 is communicatively coupled, directly and/or indirectly, to every other network captured traffic distribution device 100 included in stacked topology 203. Furthermore, in the illustrated mesh topology 206, every network captured traffic distribution device 100 is communicatively coupled, directly and/or indirectly, to a large capacity network captured distribution device 220. In one embodiment, large capacity network captured distribution device 220 may include at least fifteen chassis that supports at least ten installed line cards, wherein each line card may support, for example, approximately 600 Gbps throughput.

Figure 3:
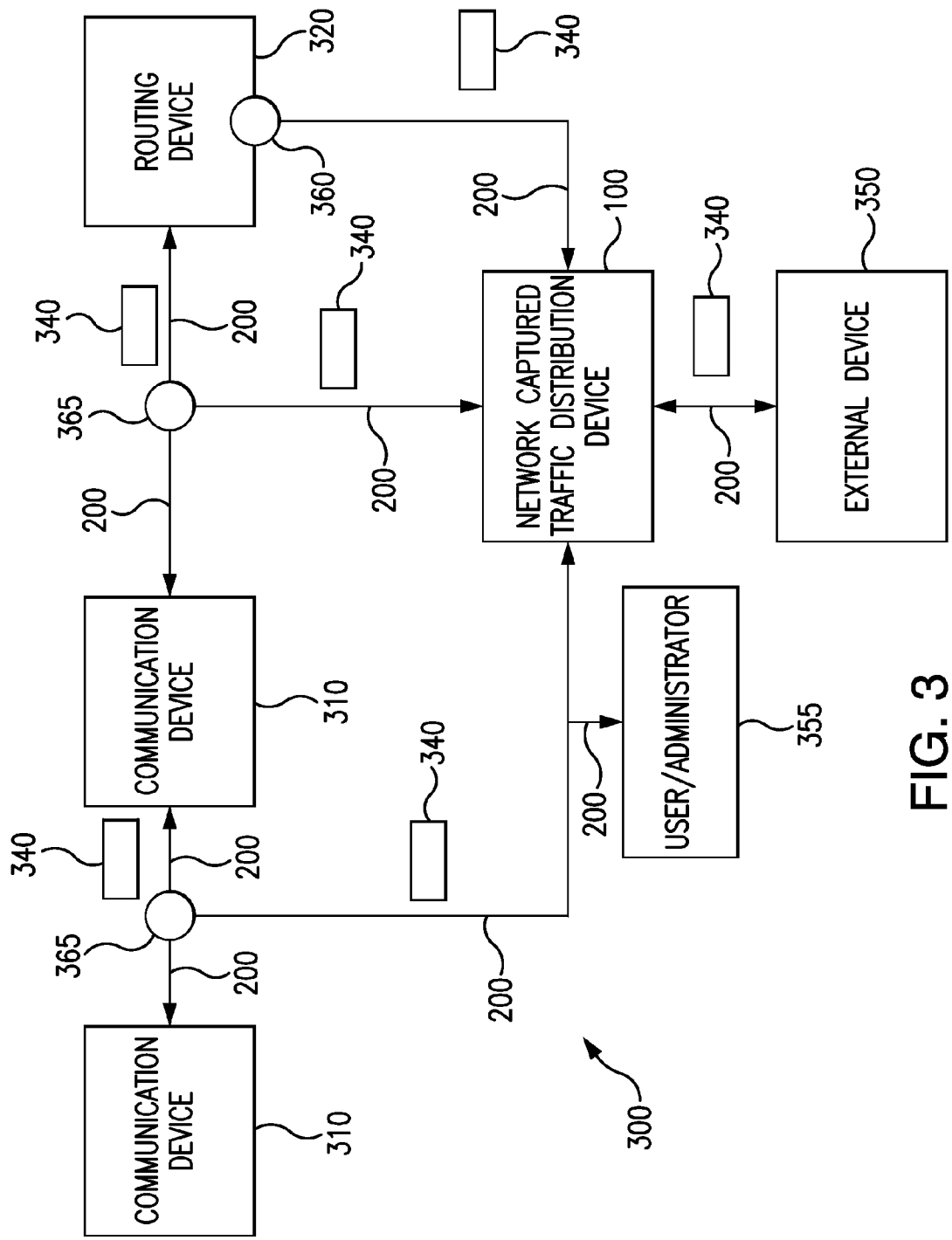
FIG. 3 is a block diagram illustrating an exemplary system for capturing network traffic, in accordance with an embodiment of the present invention.

FIG. 3 is a block diagram depicting a network communication system 300. System 300 may be, for example, any network system capable of transmitting and/or receiving data packets. In one embodiment, system 300 is a telecommunication system such as a Global System for Mobile communication (GSM) system. In some embodiments, system 300 may be Gateway General Packet Radio Service (GPRS) system, an Enhanced Data Rates for GSM Evolution (EDGE) system, an Enhanced GPRS (EGPRS) system, an International Mobile Telecommunications-2000 (IMT-2000) system, an IMT Single Carrier (IMT-SC) system, an Universal Mobile Telecommunications System (UMTS) system, a Long Term Evolution (LTE) system, a Code Division Multiple Access (CDMA) system, a system compliant with the IEEE 802.1 Q standard for configuring virtual LANs (VLAN), or a system enabled to transmit and/or receive data packets including VLAN tags. System 300 may also be, for example, a carrier Ethernet system, a network security system, and/or a VoIP system.

System 300 may include two or more communication devices 310 coupled to one another via communication links 200. Communication devices 310 may be any device capable of generating, receiving, transmitting, and/or forwarding network traffic or a data packet, such as data packet 340 to, for example, another communication device 310 and/or a routing device 320 via communication link 200. Exemplary communication devices 310 may include personal computers, mobile computing devices, and mobile telephones. Data packet 340 may be any type of data packet or amount of data transmitted via system 300. Communication device 310 may also receive data packet 340 via communication link 200 from another communication device 310 and/or routing device 320. Routing device 320 may be any router enabled to route data packets through communication system 300.

One or more communication devices 310 may be coupled to a network captured traffic distribution device 100 via communication link 200. Exemplary network captured traffic distribution devices 100 include network captured traffic distribution devices, network taps, network bypass devices, network fail-safe devices, link bypass appliances, and firewalls.

Network captured traffic distribution device 100 may also be communicatively coupled so as to provide information to and/or receive instructions from a user and/or administrator 355. User/administrator 355 may be, for example, a user and/or administrator of system 300 and/or network captured traffic distribution device 100.

Network captured traffic distribution device 100 may be communicatively coupled via communication link 200 to a mirror port 360 present on routing device 320 and may receive a traffic flow of captured data packets, including data packet 340, from routing device 320 via mirror port 360. Network captured traffic distribution device 100 may also be communicatively coupled to an inline traffic capture point 365 located along a communication link between communication devices 310 and/or between communication device 310 and routing device 320. Network captured traffic distribution device 100 may capture data packets, like data packets 340 and/or receive captured data packets, via inline network traffic point 365. Network captured traffic distribution device 100 may further be coupled to an external device 350 via, for example, an egress port. Exemplary external devices 350 may include a network monitor, a network analyzing device, a communication device, a protocol analyzer, a flight recorder, an intrusion detection system, a media analyzer, a signaling analyzer, a web analyzer, a database analyzer, a voice signaling analyzer, an Internet protocol television (IPTV) analyzer, an application analyzer, a voice analyzer, a telecommunications analyzer, and a forensic analyzer. Network captured traffic distribution device 100 may also echo one or more data packets to, for example, communication device 310 and/or external device 350.

Figure 4A:
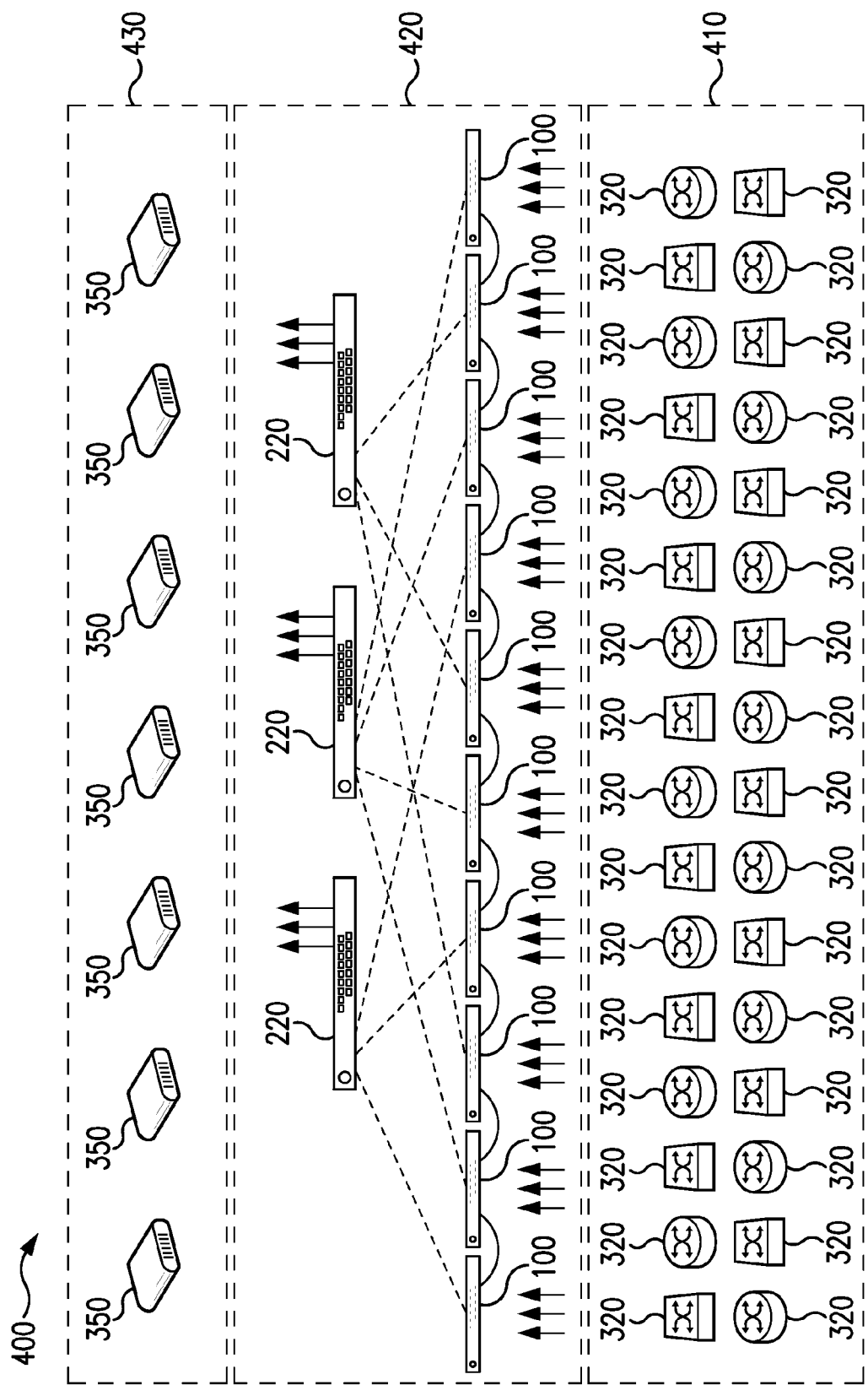
FIGS. 4A and 4B are block diagrams illustrating exemplary stacked topologies of network captured traffic distribution devices configured as a layer intervening between a communication infrastructure layer and an external device layer, in accordance with an embodiment of the present invention.

FIG. 4A is a block diagram illustrating a layered system 400 including an exemplary stacked topology of network captured traffic distribution devices wherein the stacked topology is a layer intervening between a layer of communication infrastructure devices and a layer of external devices such as monitoring devices and/or analyzing devices. System 400 includes three layers; a communication infrastructure layer 410, a captured traffic distribution layer 420, and an external device layer 430.

Communication infrastructure layer 410 includes a plurality of communication infrastructure devices 320, such as routers and switches. One or more communication devices 320 may be communicatively coupled with one another, and/or one or more network captured traffic distribution devices 100 as included in the captured traffic distribution layer 420 via, for example, inline traffic capture point 365 or mirror port 360. Captured traffic distribution layer 420 may include multiple network captured traffic distribution devices 100 arranged in a distributed stacked topology. Some, or all, network captured traffic distribution devices 100 may further be communicatively coupled to one or more large capacity network captured traffic distribution devices 220. Large capacity network captured traffic distribution devices 220 may be capable of, for example, aggregating captured network traffic received from a plurality of network captured traffic distribution devices 100 and/or filtering captured network traffic received from a plurality of network captured traffic distribution devices 100. One or more large capacity network captured traffic distribution devices 220 may be communicatively coupled to one or more external devices 350 as provided in external device layer 430.

Figure 4B:
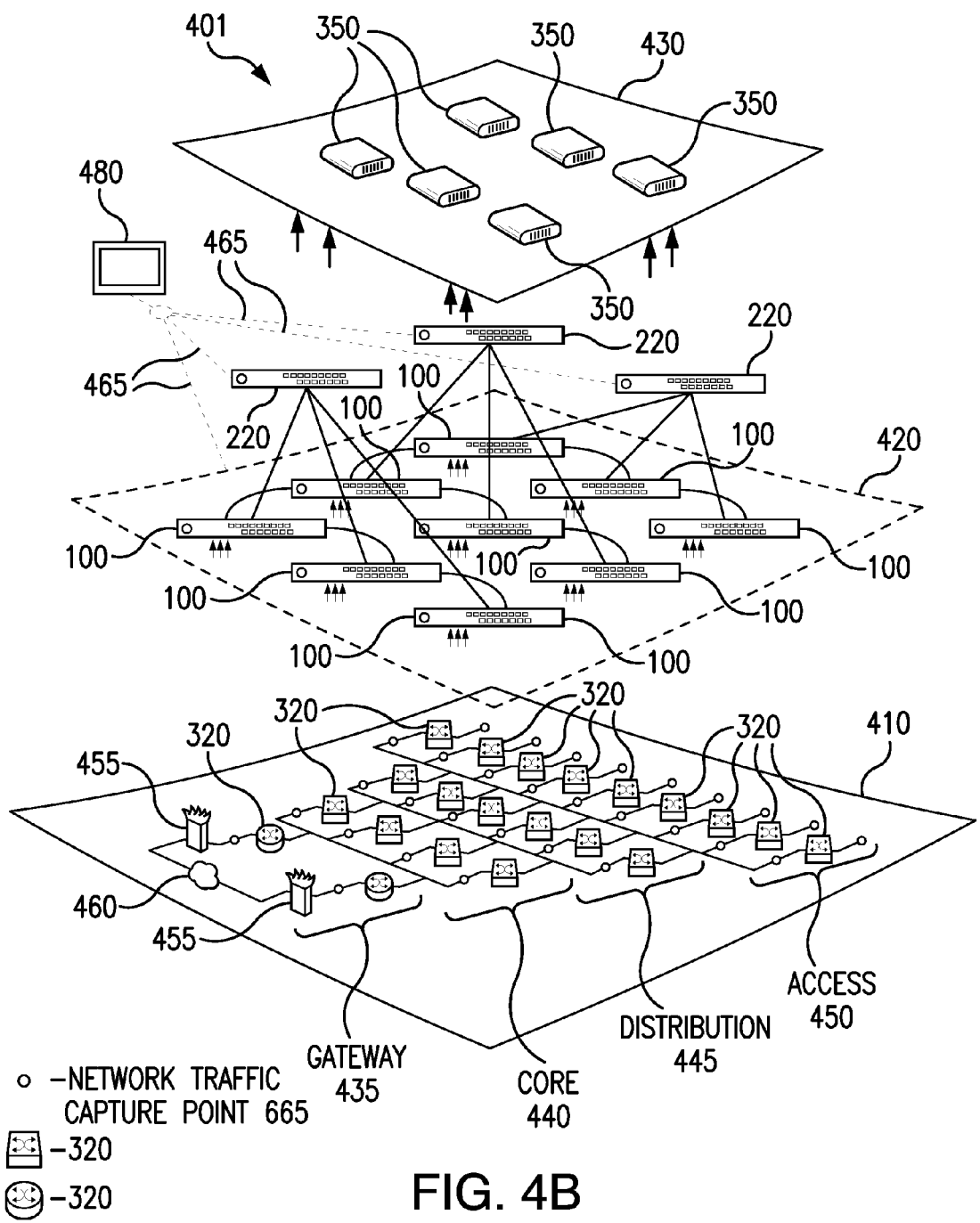

FIG. 4B is a diagram illustrating an exemplary layered system 401 including an exemplary stacked topology of network captured traffic distribution devices wherein the stacked topology is a layer intervening between a layer of communication infrastructure devices and a layer of external devices such as monitoring devices and/or analyzing devices. System 401 includes communication infrastructure layer 410, captured traffic distribution layer 420 and external device layer 430. Some or all communication links included in system 401 may include an inline traffic capture point 365.

Communication infrastructure layer 410 includes a gateway layer 435, a core layer 440, a distribution layer 445, and an access layer 450. Gateway layer 435 may include, for example, a network cloud 460 communicatively coupled to a plurality of firewalls 455 that are communicatively coupled via a communication link, like communication link 200, to a plurality of communication infrastructure devices 320. Communication infrastructure devices 320 of gateway layer 435 may be communicatively coupled via a communication link, like communication link 200, to a plurality of communication infrastructure devices 320 included in core layer 440. Communication infrastructure devices 320 of core layer 440 may be communicatively coupled via a communication link, like communication link 200, to a plurality of communication infrastructure devices 320 included in distribution layer 445. Communication infrastructure devices 320 of distribution layer 445 may be communicatively coupled via a communication link, like communication link 200, to a plurality of communication infrastructure devices 320 included in access layer 450.

One or more communication infrastructure devices 320 of communication infrastructure layer 410 may be communicatively coupled via, for example, a communication link, like communication link 200 or inline traffic capture point 365 or a mirror port, like mirror port 360, to one or more network captured traffic distribution devices 100 included in captured traffic distribution layer 420. Captured traffic distribution layer 420 may include a plurality of network captured traffic distribution devices 100 communicatively coupled to one another or arranged in a stacked topology via communication links 200. Network captured traffic distribution devices 100 may be further coupled to large capacity network traffic captured distribution devices 220. Large capacity network captured traffic distribution devices 220 may be coupled to a central management device 480 via a management communication link 465. Management communication link 465 may be any appropriate wired or wireless link that enables communication between high capacity network captured traffic distribution device 220 and central management device 480. Exemplary central management devices 480 include a computer monitor or computer system as may be managed by a user and/or administrator such as user administrator 355. Large capacity network captured traffic distribution devices 220 may be further coupled to one or more external devices 350 as included in external device layer 430.

FIG. 5A is a block diagram of an exemplary data packet 501. Data packet 501 includes a header 505, a payload 515, and an old frame check sequence (FCS) and/or cyclic redundancy check (CRC) block 520. In some embodiments, data packet 501 may resemble data packet 340. Header 505 may include, for example, address information and other information, as needed, for the transmission of data packet 501 through a network communication system, like network communication system 300. Payload 515 may include any payload or data appropriate for data packet 501. Old FCS/CRC block 520 may include information necessary for compliance with one or more system protocols, communication protocols, and/or the routing of data packet 501 through a network communication system, like network communication system 300.

FIG. 5B illustrates an exemplary modified data packet 502 including header 505, payload 515, a VLAN tag 510, and a new FCS/CRC 530. In some cases modified data packet 502 may be a modified form of data packet 501 and/or 340. Modified data packet 502 may be generated via a process for inserting a VLAN tag into a data packet. Although FIG. 5B indicates a location of VLAN tag 510 that is immediately after header 505, VLAN tag 510 may be inserted into any location within modified data packet 502. New FCS/CRC 530 may include information indicating that data packet 502 includes a VLAN tag and in some cases may be an updated version of old FCS/CRC 520.

Figure 6:
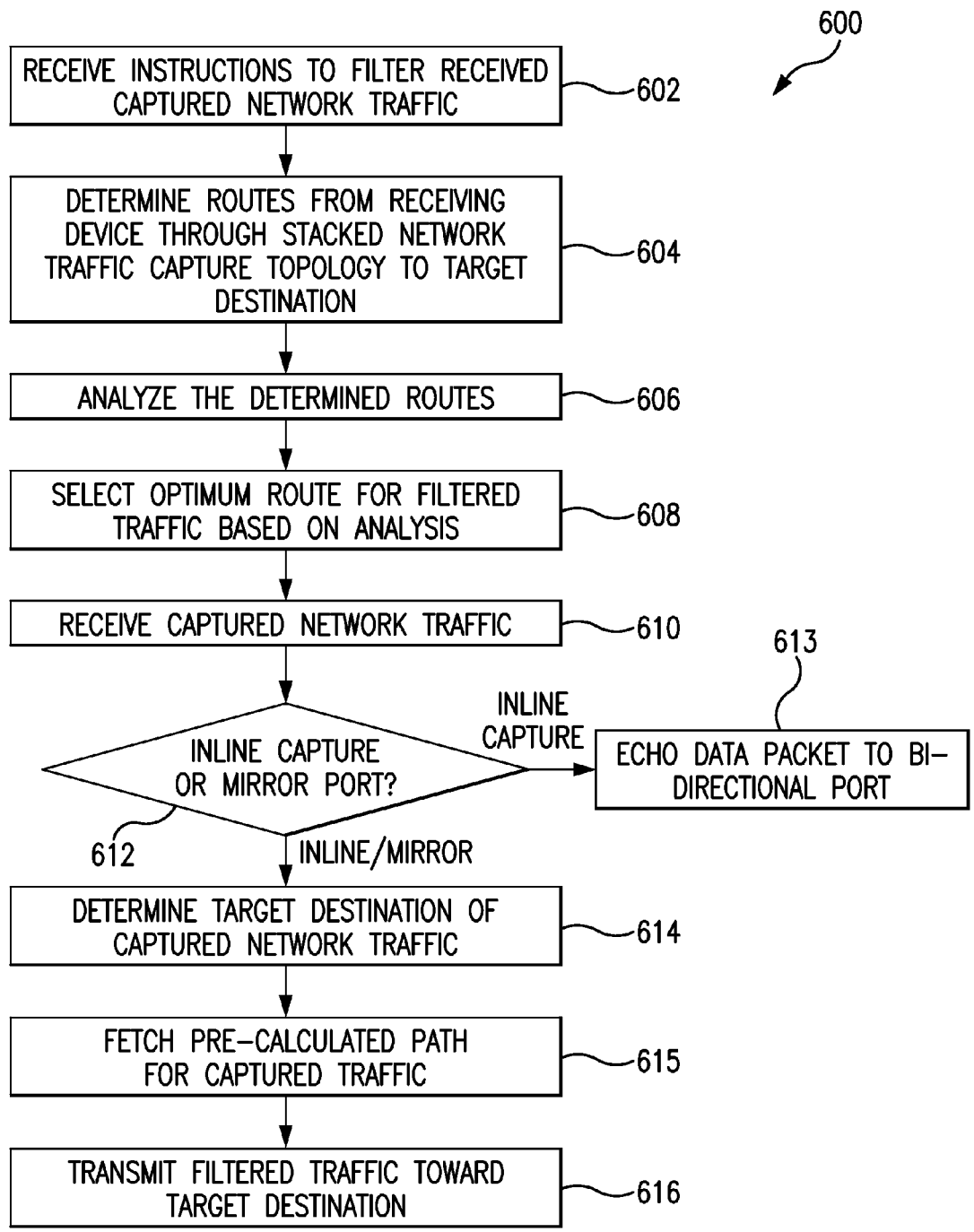
FIG. 6 is a flowchart illustrating an exemplary process for determining an optimum route through a stacked topology of network captured traffic distribution devices, in accordance with an embodiment of the present invention.
Figure 7:
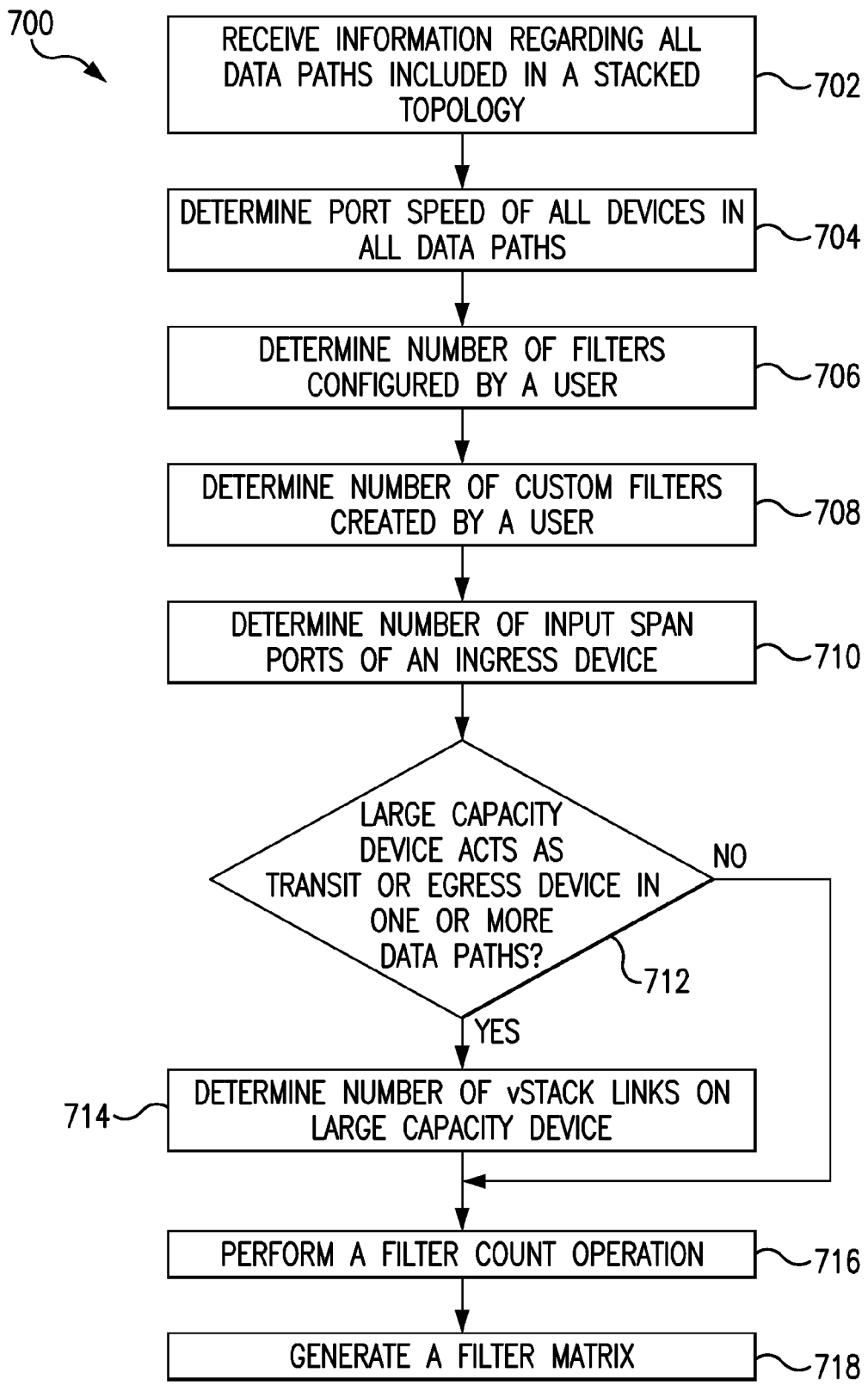
FIG. 7 is a flowchart illustrating an exemplary process for determining an optimum route through a stacked topology of network captured traffic distribution devices, in accordance with an embodiment of the present invention.

FIGS. 6 and 7 are flowcharts illustrating an exemplary process 600 for determining an optimum route through a stacked topology of network captured traffic distribution devices, in accordance with an embodiment of the present invention. Process 600 may be executed by, for example, any of the devices and/or systems disclosed herein. Before turning to descriptions of FIGS. 6 and 7, it is noted that the flow diagrams in FIGS. 6 and 7 show examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed.

In step 602, instructions to filter received captured network traffic may be received by, for example, a network captured traffic distribution device included in a stacked topology of network captured traffic distribution devices, such as network captured traffic distribution device 100. The instructions may be received from, for example, a user and/or administrator of the captured network distribution device, such as user/administrator 355 via, for example, a GUI and/or a management port, such as management port 140. The instructions may also be received as, for example, exchanged configuration information from a network captured traffic distribution device included in the stacked topology. The instructions of step 602 may also be received by a processor, like processor 170, from, for example, a memory, such as memory 180.

The received instructions may indicate that received captured network traffic is to be filtered according to a criterion or combination of criteria. Exemplary criterion include, but are not limited to, an origin of the captured network traffic, a target destination of the captured network traffic, a source of the captured network traffic, a type of the captured network traffic, a protocol used to encode the captured network traffic, a size of one or more data packets included in the captured network traffic, a speed at which the captured network traffic is received, and an operating condition within the stacked topology, a receiving network captured traffic distribution device, and/or a target destination.

In preferred embodiments, filtration instructions may enable the filtering of captured network traffic based on an amount of available capacity associated with the stacked topology, a communication link, a receiving network captured traffic distribution device, a target destination, a communication device coupled to the stacked topology and/or an external device coupled to the stacked topology. Indicators of available capacity include a maximum transmission or intake speed for captured traffic and a level of congestion associated with the stacked topology, a communication link, a receiving network captured traffic distribution device, and/or a target destination.

In one embodiment, filtration instructions may be specific to one or more characteristics of the captured network traffic such that, for example, all captured traffic received from a source or via a particular bidirectional port included in the network captured traffic distribution device is filtered.

In yet another embodiment, filtration instructions may enable the filtering of captured network traffic based on a target destination associated with the captured network traffic. Exemplary target destinations include a network captured traffic distribution device included in the stacked topology, a monitoring device, a protocol analyzer, a flight recorder, an intrusion detection system, a media analyzer, a signaling analyzer, a web analyzer, a database analyzer, a voice signaling analyzer, an IPTV analyzer, an application analyzer, a voice analyzer, and a forensic analyzer.

Next, in step 604 one or more routes, or transmission pathways, from the receiving network captured traffic distribution device through the stacked topology to the target destination may be determined. In some cases, a route may be determined in real time or on an as-needed basis. In one embodiment, the determination of step 604 may include accessing one or more pre-calculated routes for the transmission of received captured network traffic through the stacked topology to a target destination. Pre-calculated routes may be stored at, for example, the network captured traffic distribution device in a memory, such as memory 180, accessed via another network captured traffic distribution device included in the stacked topology and/or accessed from an external storage location via, for example, a management port, such as management port 140 and/or bidirectional port 110. In another embodiment, one or more routes may be determined via a download or exchange from a web browser by the network captured traffic distribution device. In some cases, step 604 may include accessing previously stored determined routes and/or selected optimum routes.

In step 606, the determined and/or pre-calculated routes may be analyzed according to one or more criterion. In some cases, the analysis of step 606 may include determining a transmission capacity or port speed available for each route and/or segment of a route determined in step 604. The analysis may also include determining, for each route, the number of network captured traffic distribution devices in the stacked topology that received captured data packets will pass through prior to arrival at the target destination. The analysis of step 606 may further include analyzing filtering capacity available for each route and/or segment of a route determined in step 610. Further details regarding the analysis of step 606 are discussed below with reference to FIG. 7 and process 700.

Next, in step 608, an optimum route for transmission of the captured network traffic may be selected based upon, for example, the analysis of step 606.

Next, in step 610, captured network traffic may be received by, for example, the network captured traffic distribution device, according to, for example, any of the methods described herein. Then, in step 612, it may be determined whether the captured network traffic was received via an inline traffic capture point, such as inline traffic capture point 365 and/or a mirror port, such as mirror port 360. When the captured network traffic is received via an inline capture point, the received network captured traffic may be echoed to a bidirectional port, such as bidirectional port 110, resident on the network captured traffic distribution device (step 613). Whether the captured traffic was received via an inline captured traffic point or a mirror port, a target destination of the captured traffic may be determined (step 614). Exemplary target destinations of the captured network traffic include a network captured traffic distribution device included in the stacked topology, a monitoring device, a protocol analyzer, a flight recorder, an intrusion detection system, a media analyzer, a signaling analyzer, a web analyzer, a database analyzer, a voice signaling analyzer, an IPTV analyzer, an application analyzer, a voice analyzer, a telecommunications analyzer, and a forensic analyzer. Next, in step 615, the optimum pre-calculated path for the captured traffic may be fetched. The filtered captured network traffic may then be transmitted toward the determined target destination via, for example, step 616. Following step 616, process 600 may end.

FIG. 7 is a flowchart illustrating an optional process 700 or steps included in the analysis of step 606 as discussed above with regard to FIG. 6. Process 700 may be executed by, for example, any of the devices and/or systems disclosed herein.

In step 702, information regarding some or all data paths available or included in a stacked topology may be received by, for example, a network captured traffic distribution device, such as network captured traffic distribution device 100. The information may be received via, for example, an exchange of configuration information, between the network captured traffic distribution device and an additional network captured traffic distribution device included in the stacked topology or a message from, for example, an additional network captured traffic distribution device included in the stacked topology, a communication device, or an external device.

According to an embodiment of the present invention, at least some of the network captured distribution devices included in the stacked topology may have variable speed ports and limited filtering resources available based on the model of a particular network captured distribution device. Configuring the port speed on a port-by-port basis allows the port speed to be optimized to a corresponding device that is attached to a port. Accordingly, in step 704, a port speed of some or all of the ports of network captured traffic distribution devices included in the stacked topology and/or communication devices and external devices coupled to the stacked topology may be determined.

Further, according to an embodiment of the present invention, filtering resource availability takes into account the following parameters: a number of filters pre-configured by a user, a number of customized filters created by a user, a number of input SPAN ports available on an ingress network captured distribution device and a number of links between stacking ports (referred to hereinafter as "vStack" links) available on a particular network captured distribution device if that device acts as a transit or egress device. Then, in step 706, a number of pre-configured filters for some or all of the network captured traffic distribution devices included in the stacked topology may be determined. Filters can be based on a criterion or combination of criteria. Exemplary criterion include, but are not limited to, an origin of the captured network traffic, a target destination of the captured network traffic, a source of the captured network traffic, a type the captured network traffic, a protocol used to encode the captured network traffic, a size of one or more data packets included in the captured network traffic, a speed at which the captured network traffic is received, and an operating condition within the stacked topology, a receiving network captured traffic distribution device, and/or a target destination.

Optionally, in step 708, the number of customized filters created by a user may be determined. The overall description of FIG. 8 below explains how filter usage impacts filtering capability (filter count) calculations. Next, in step 710, the number of input SPAN ports configured as input ports for the filter on an ingress network captured distribution device may be determined. Ingress SPAN allows the monitoring of some or all packets that ingress a specified port or ports. The SPAN feature is non-intrusive and does not affect switching of network traffic for any SPAN source ports; it may, however, in some cases slow down the traffic in source ports.

According to an embodiment of the present invention, in step 712, it may be determined whether one or more large capacity devices act as transit or egress devices along one or more data paths (routes) identified in step 604 described above with reference to FIG. 6. In response to identifying one or more large capacity transit and/or egress devices along at least one data path (step 712, "YES" branch), in step 714, a number of vStack links associated with the large capacity device may be determined. It is noted that packets sent out over vStack links have a VLAN tag added to each packet, as described earlier with reference to FIGS. 5A and 5B. The VLAN tag is used by the stacked topology to keep track of where the packets came from and where they need to go. The description of FIGS. 9A-11B hereinafter explains how the determined number of vStack links impacts the filter count calculations.

Next, as shown in FIG. 7, in response to not identifying any large capacity devices along the one or more determined routes (step 712, "NO" branch) or after determining the number of vStack links, filtering resource availability of some or all of the network captured traffic distribution devices included in the stacked topology may be determined by performing a filter count operation in step 716. The filter count operation will be described in more detail below. Finally, in step 718, a filter matrix may be optionally generated. The generated filter matrix is preferably used for selecting optimum route for filtered traffic in step 608 described above.

Figure 8:
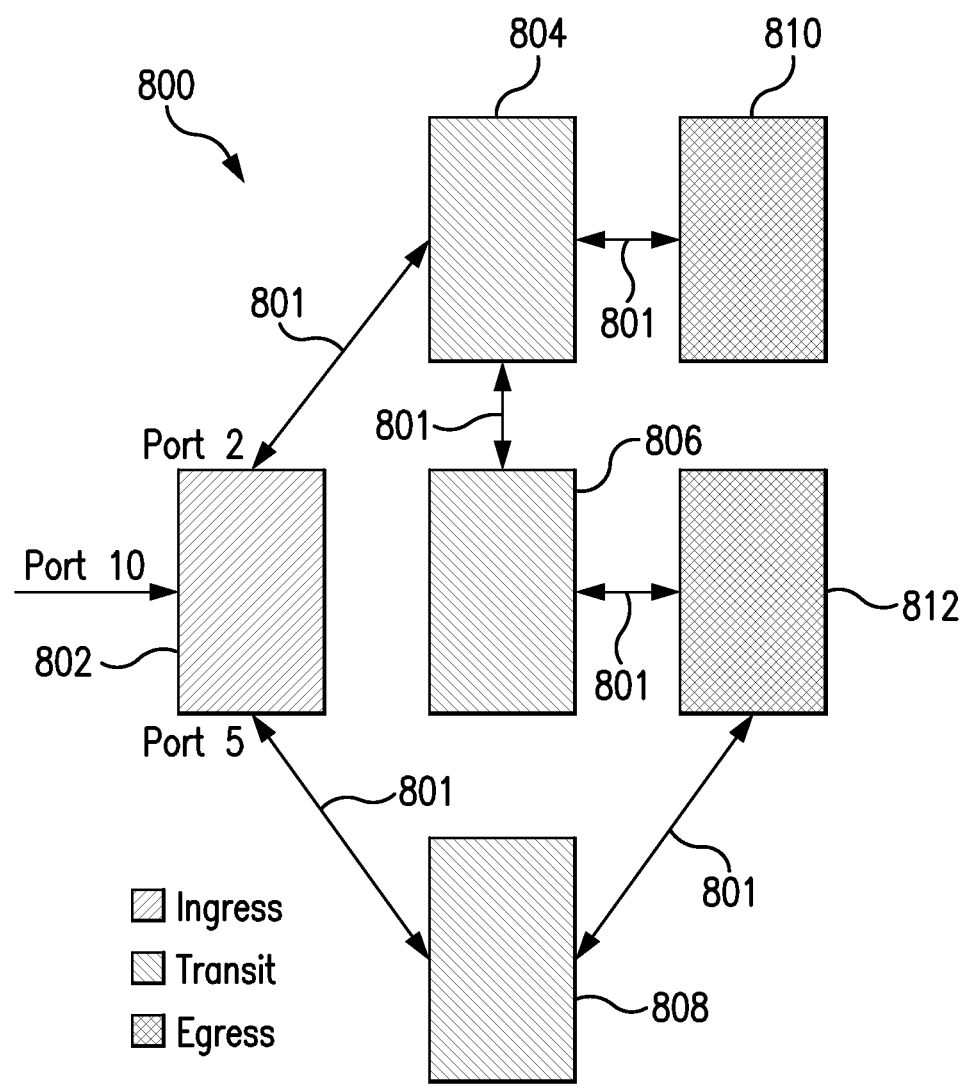
FIG. 8 is a block diagram illustrating how one or more user configured filters affect a filter count operation, in accordance with an embodiment of the present invention.

FIG. 8 is a block diagram illustrating how one or more user configured filters affect a filter count operation, in accordance with an embodiment of the present invention. Specifically, FIG. 8 illustrates an exemplary arrangement 800 of a plurality of network captured traffic distribution devices 802-812 communicatively coupled to one another or arranged in a stacked topology via communication links 801. In this example, the stacked topology includes one ingress network captured distribution device (referred to hereinafter as receiving or ingress device) 802 having ports 2 and 5, three transit network captured distribution devices (transit devices) 804-808 and two egress network captured distribution devices (referred to hereinafter as target or egress devices) 810 and 812. For illustrative purposes only, assume that devices 802-810 have maximum filtering capability of 2K, while the second egress device 812 has maximum filtering capability of 3K. Now assume that a user creates 1K filter for packets travelling between ingress device 802 and egress device 810. In one embodiment, the optimal path (route) chosen for this user configured filter may comprise the following devices: 802-804-810. In this case each of the devices, namely ingress device 802, transit device 804 and egress device 810 would be using 1K of their corresponding filtering capability of 2K.

Now continuing with the above example, further assume that the user creates another customized 1K filter for the captured traffic travelling between ingress device 802 and egress device 812. In this case two different paths may be considered by the stacked topology for creating this filter. A first path may comprise ingress device 802 (port 2)-transit device 804-transit device 806-egress device 812. A second path may comprise ingress device 802 (port 5)-transit device 808-egress device 812. According to an embodiment of the present invention, the second path may be selected as an optimal route if all communication links 801 have the same speed. Advantageously, the optimum path may be chosen based on minimal expected cost and based on filter resource availability. For example, optimum path calculation may involve identifying a path having "lowest cost" and determining if the identified path satisfies all filtering requirements. In response to determining that all filtering requirements are satisfied the identified path is selected as an optimum path. Otherwise, another path is considered that might have higher cumulative cost. It is noted that cost associated with each link is inversely proportional to speed of that link and that cumulative cost is determined based on a sum of each link along the path under consideration. It should be further noted that the filter count operation performed in the process of identifying the second-path as an optimum route for the newly created filter would determine that both ingress device 802 and transit device 804 have reached the maximum amount (2K) of available filtering capacity associated therewith, while each of the devices 806, 810 and 812 have 1K of available filtering capacity associated therewith. It should be further noted that since both devices 802 and 804 have reached their maximum capacity, any additional filters routed through those devices would fail.

Now consider an alternative continuation of the above example, where instead of creating customized 1K filter for the captured traffic travelling between ingress device 802 and egress device 812 with one SPAN port, namely port 10 shown in FIG. 8, the user creates customized 1K filter for the captured traffic travelling between ingress device 802 and egress device 812 with two input SPAN ports, namely port 10 and an additional input SPAN port not shown in FIG. 8, In this case, the same optimal path (route) consisting of devices 802-804-810 may be chosen. However, in this case, the performed filter count operation would determine that an amount of available filtering capacity associated with the ingress device 802 would remain unchanged due to utilization of the second input SPAN port, while amounts of available filtering capacity associated with the transit device 804 and egress device 810 would be increased by 1K and would reach maximum filtering capacity associated with those devices. This example illustrates that, according to an embodiment of the present invention, an amount of available filtering capacity associated with ingress device 802 is directly related to the filtering amount associated with each user-configured filter, while an amount of available filtering capacity associated with transit devices (e.g., device 804) and egress devices (e.g., device 810) is related to a product of filtering amount associated with each user-configured filter and a number of input SPAN ports configured as input ports for that filter on the ingress device 802. According to an embodiment of the present invention, the above described filtering resources availability consideration and input SPAN ports availability consideration are preferably taken into account in step 606 in order to determine an optimum route for the filtered traffic.

Figure 9A:
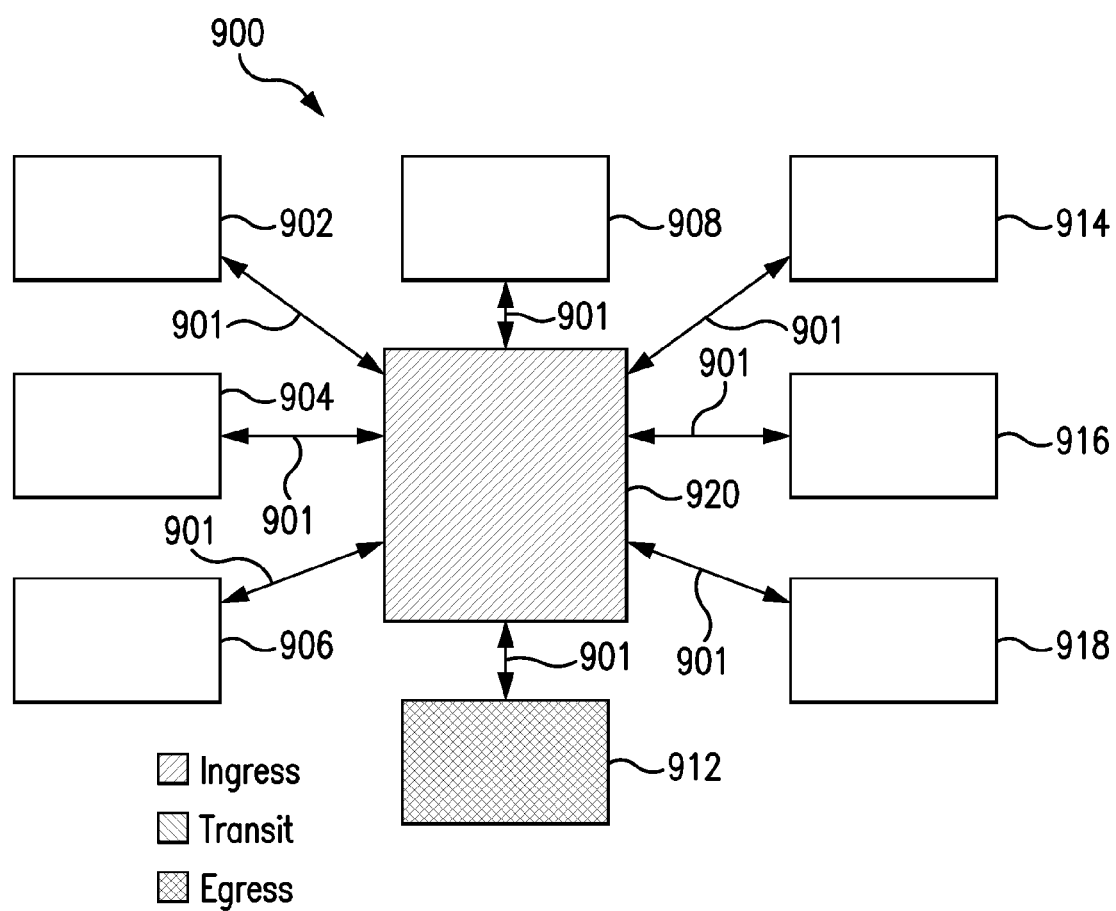
FIGS. 9A and 9B are block diagrams illustrating a filter count operation in a case where a large capacity device acts as an ingress device, in accordance with an embodiment of the present invention.
Figure 9B:
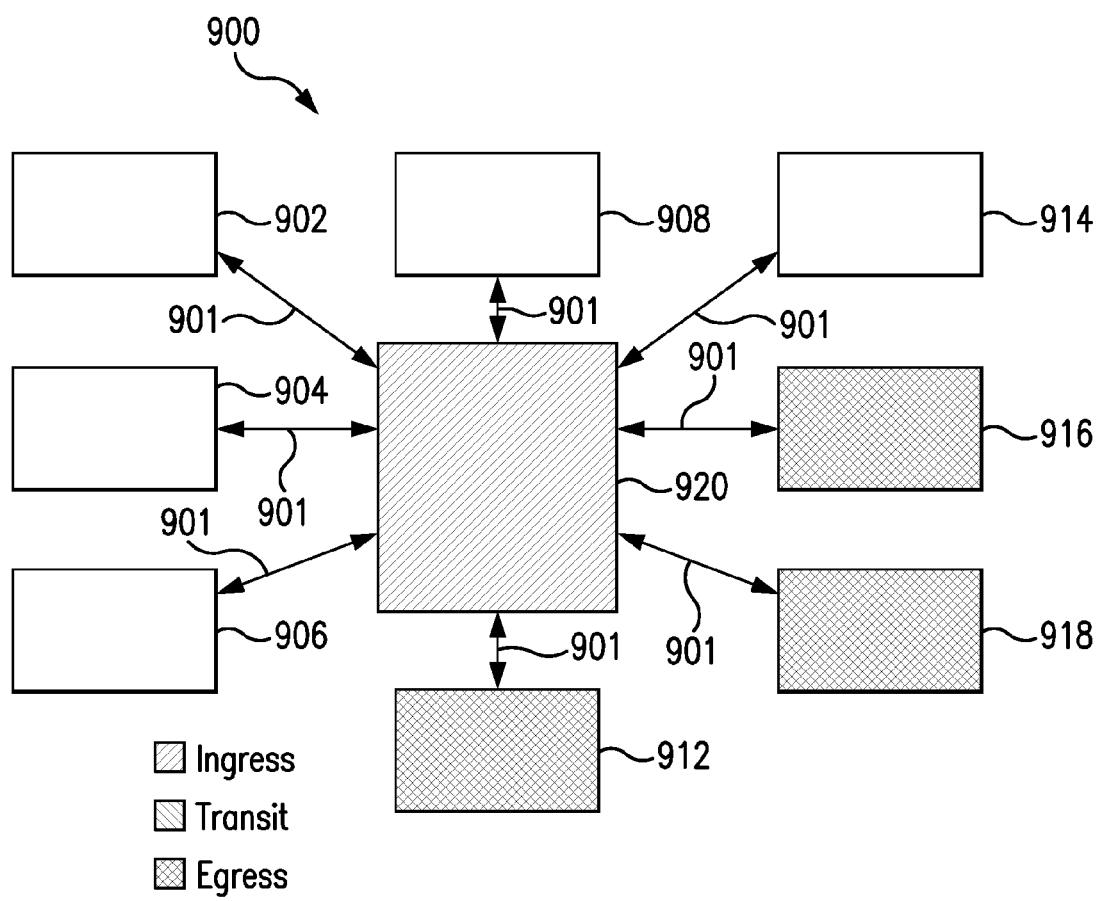

According to an embodiment of the present invention, if the stacked topology includes at least one large capacity network captured distribution device then a number of available vStack links associated with the large capacity devices should be factored in by a performed filter count operation if the large capacity device acts as either a transit device or an egress device. FIGS. 9A and 9B are block diagrams illustrating a filter count operation in a case where a large capacity device acts as an ingress device, in accordance with an embodiment of the present invention. Specifically, FIGS. 9A and 9B illustrate an exemplary arrangement 900 of a plurality of network captured traffic distribution devices 902-918 communicatively coupled to a large capacity captured traffic distribution device 920 via vStack communication links 901. For illustrative purposes only, assume that devices 904, 906, 908, 914 and 916 have maximum filtering capability of 2K, device 914 has maximum filtering capability of 3K, devices 902 and 912 have maximum filtering capability of 24K while the large capacity captured traffic distribution device 920 has maximum filtering capability of 360K. Now assume that a user creates a 10K filter for packets travelling between ingress large capacity device 920 and egress device 912. In this case, the optimal path (route) chosen for this user configured filter is fairly simple and includes only devices 920 and 912, since they are directly connected to each other. The filter count operation performed for this scenario would determine that ingress large capacity device 920 is currently using only 10K of its 360K filtering capability, while egress device 912 is also using 10K of its corresponding filtering capability of 24K.

FIG. 9B illustrates the same exemplary arrangement 900 of the plurality of network captured traffic distribution devices 902-918 communicatively coupled to the large capacity captured traffic distribution device 920 via vStack communication links 901. However, in this scenario, assume that instead of creating one 10K filter, the user creates three 2K filters for packets travelling between large capacity ingress device 920 and the different egress devices, namely devices 912, 916 and 918. The filter count operation performed for the scenario depicted in FIG. 9B would determine that ingress large capacity device 920 is currently using only 2K of its 360K filtering capability, egress device 912 is using 2K of its corresponding filtering capability of 24K, while egress devices 916 and 918 have reached their maximum filtering capability of 2K. In other words, the scenarios described above in conjunction with FIGS. 9A and 9B illustrate that an amount of available filtering capacity associated with the large capacity device 920, where it acts as an ingress device, does not depend on the number of vStack communication links 901 connecting the large capacity device 920 with the remaining part of the stacked topology.

Figure 10A:
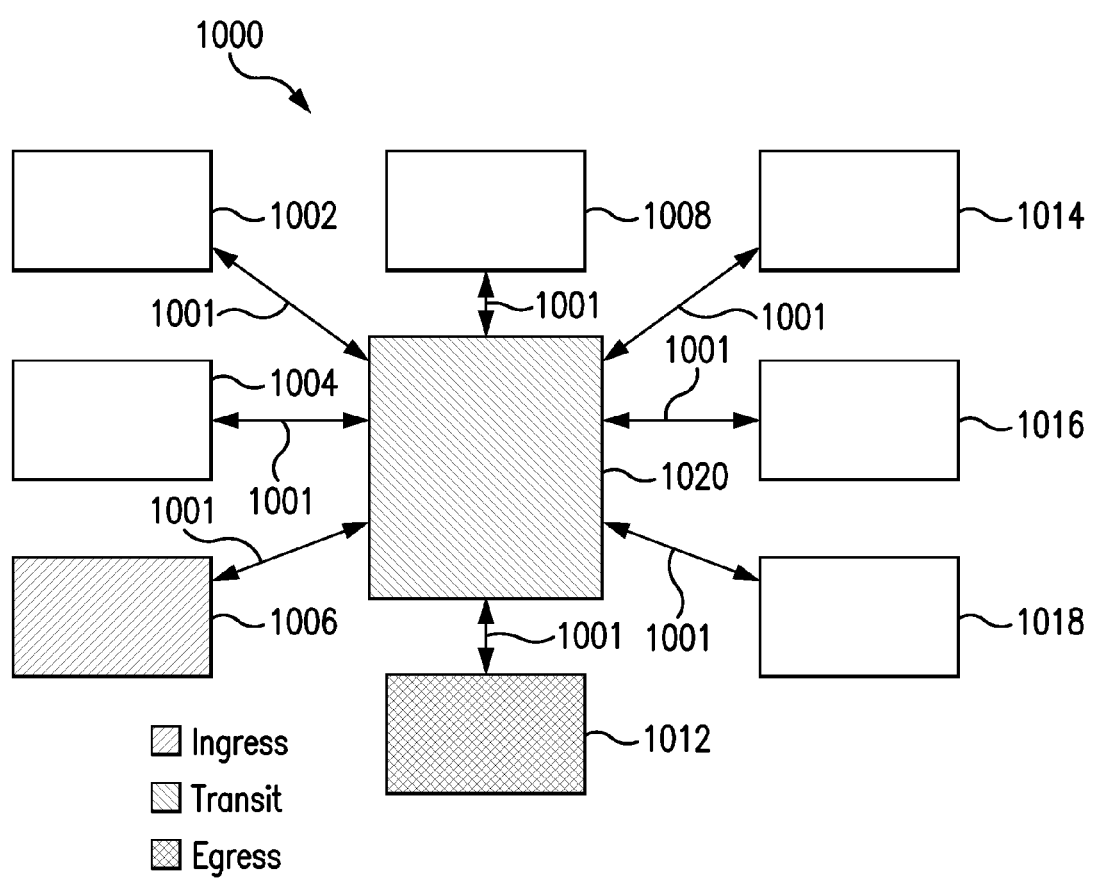
FIGS. 10A-10E are block diagrams illustrating a filter count operation in a case where a large capacity device acts as a transit device, in accordance with an embodiment of the present invention.

FIGS. 10A-10E are block diagrams illustrating a filter count operation applied to cases where a large capacity device acts as a transit device, in accordance with an embodiment of the present invention. Specifically, FIGS. 10A-10E illustrate an exemplary arrangement 1000 of a plurality of network captured traffic distribution devices 1002-1018 communicatively coupled to a large capacity captured traffic distribution device 1020 via vStack communication links 1001. It is noted that for simplicity of illustration devices 1002-1020 have the same maximum filtering capabilities as devices 902-920 described above in conjunction with FIGS. 9A and 9B. In FIG. 10A assume that a user originally creates a 2K filter (e.g., first filter) for packets travelling between devices 1006 and 1012. In one embodiment, the optimal path (route) chosen for this first user configured filter may comprise the following devices: 1006-1020-1012. In accordance with the selected optimum path, device 1006 represents an ingress device, large capacity device 1020 represents a transit device and device 1012 represents an egress device. The filter count operation performed for the scenario depicted in FIG. 10A would determine that egress device 1012 is using 2K of its corresponding filtering capability of 24K, ingress device 1006 has reached its maximum filtering capability of 2K while the transit large capacity device 1020 is currently using only 16K of its 360K filtering capability. It is noted that the exemplary filtering amount of 8*2K=16K associated with the transit large capacity device 1020 represents a product of a number of available vStack communication links, which is equal to 8 in the examples of FIGS. 10A-10E, and a filtering amount associated with the customized user filter (i.e., first filter).

Figure 10B:
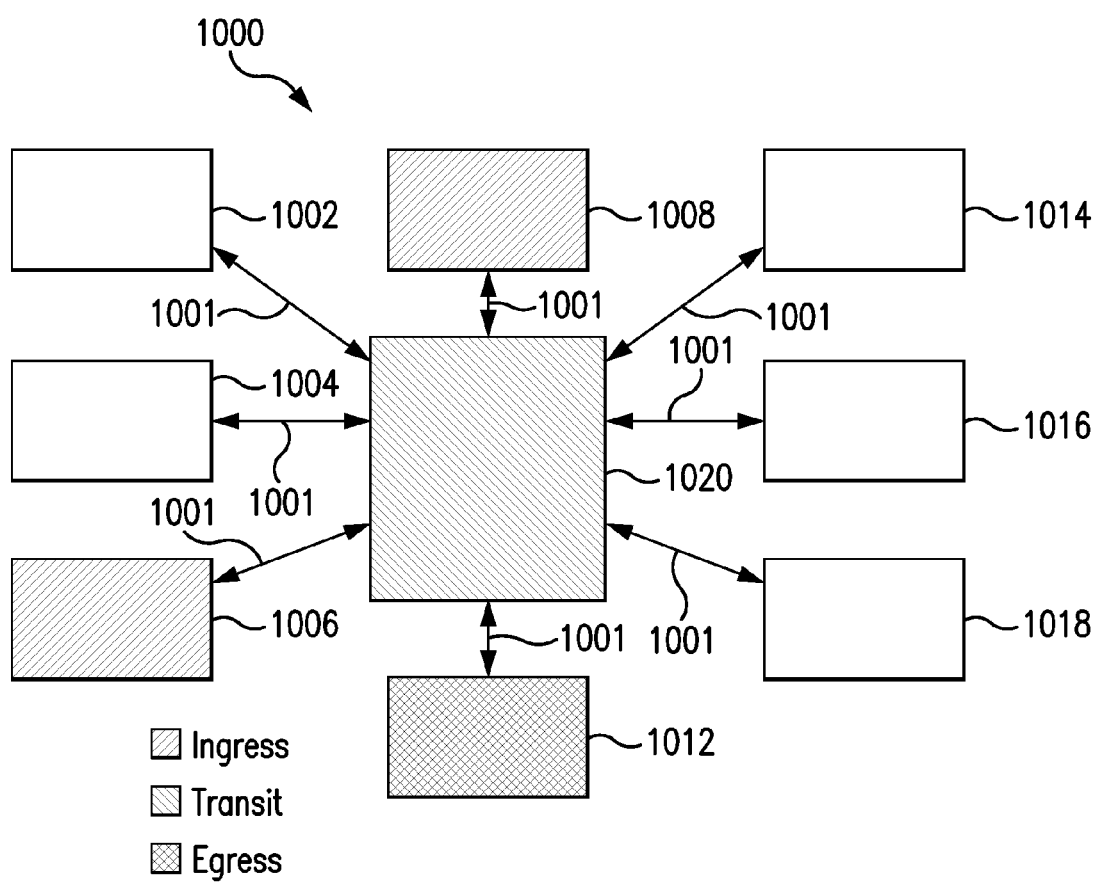

Now continuing with the above example, further assume that the user creates another customized 1.5 K filter (second filter) for the captured traffic travelling between ingress devices 1008 and 1012. FIG. 10B illustrates the arrangement 1000 where devices 1006 and 1008 represent ingress devices, large capacity device 1020 represents a transit device and device 1012 represents an egress device. The filter count operation performed for the scenario depicted in FIG. 10B would determine that egress device 1012 is now using 2K+1.5K=3.5K of its corresponding filtering capability of 24K, ingress device 1008 is currently using 1.5K of its 2K filtering capability, ingress device 1006 has reached its maximum filtering capability of 2K while the transit large capacity device 1020 is now using 16K+8*1.5K=28K of its 360K filtering capability. As indicated above, with respect to the large capacity transit device 1020, the filter count operation determines a product of a number of available vStack communication links and a filtering amount associated with the customized user filter (i.e., second filter).

Figure 10C:
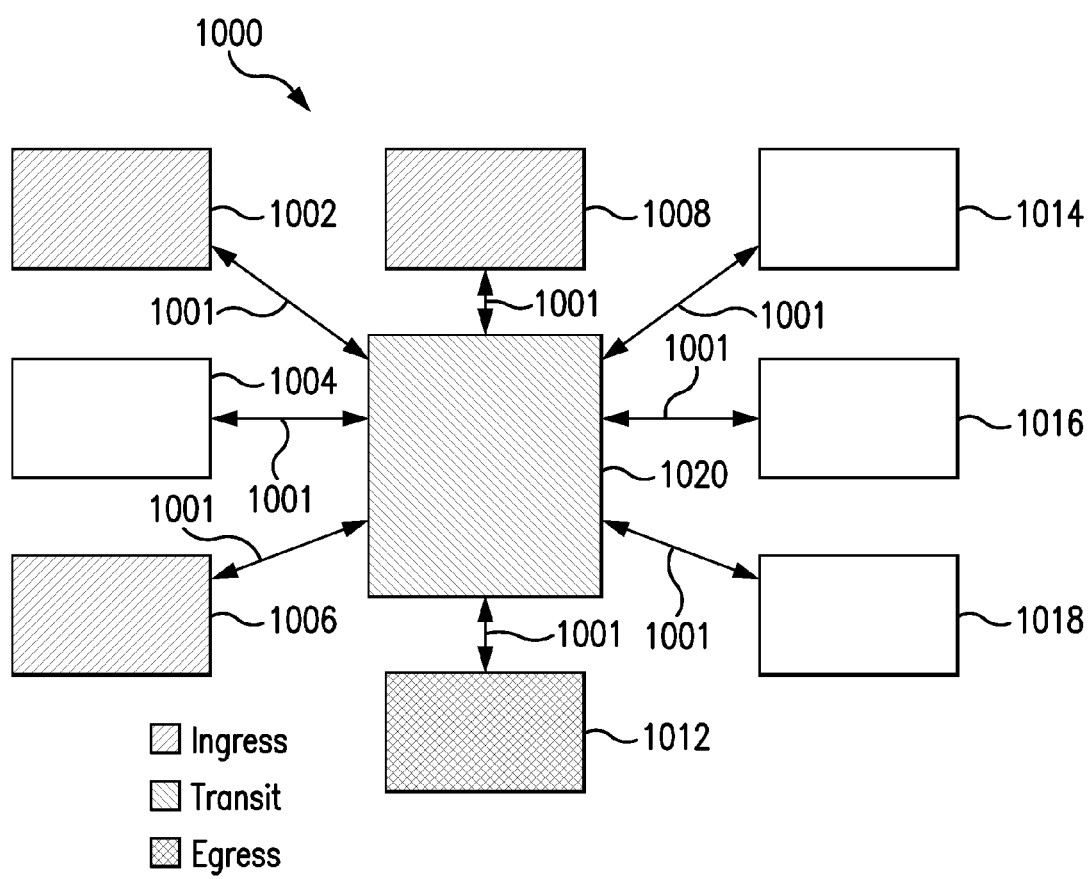
Figure 10D:
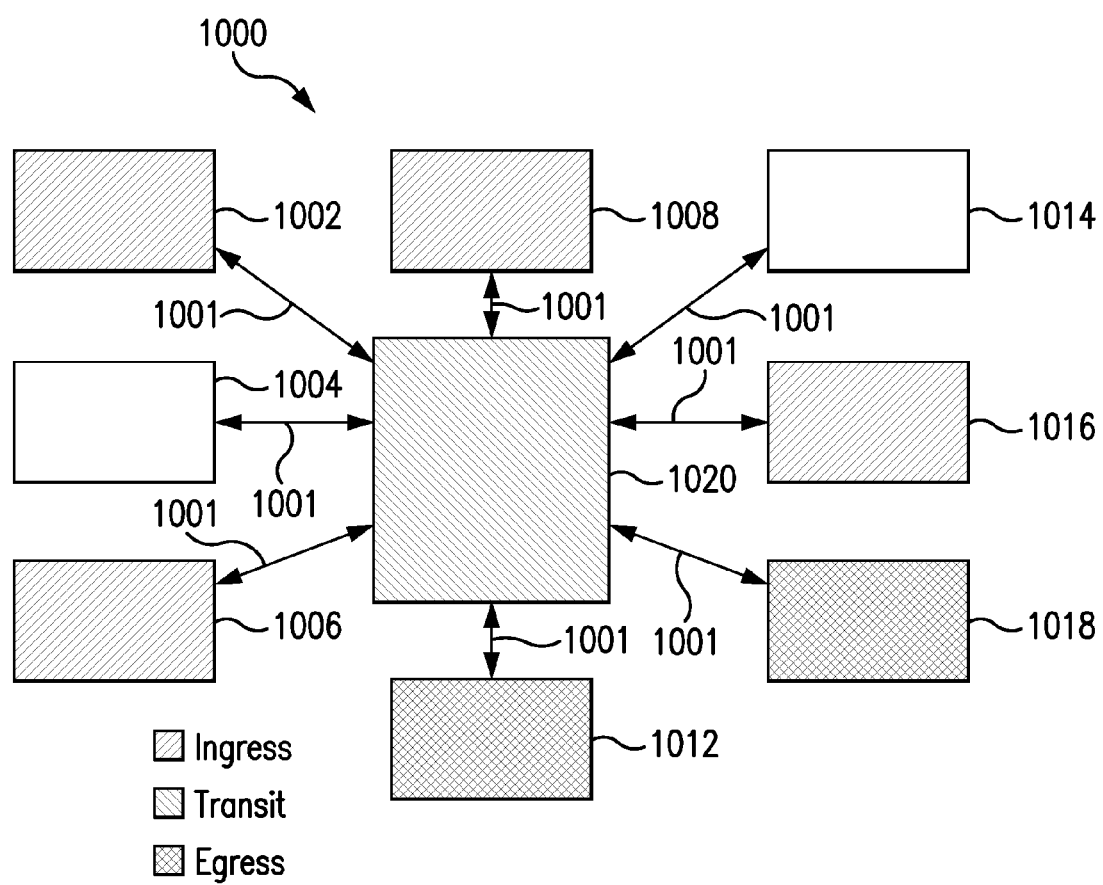
Figure 10E:
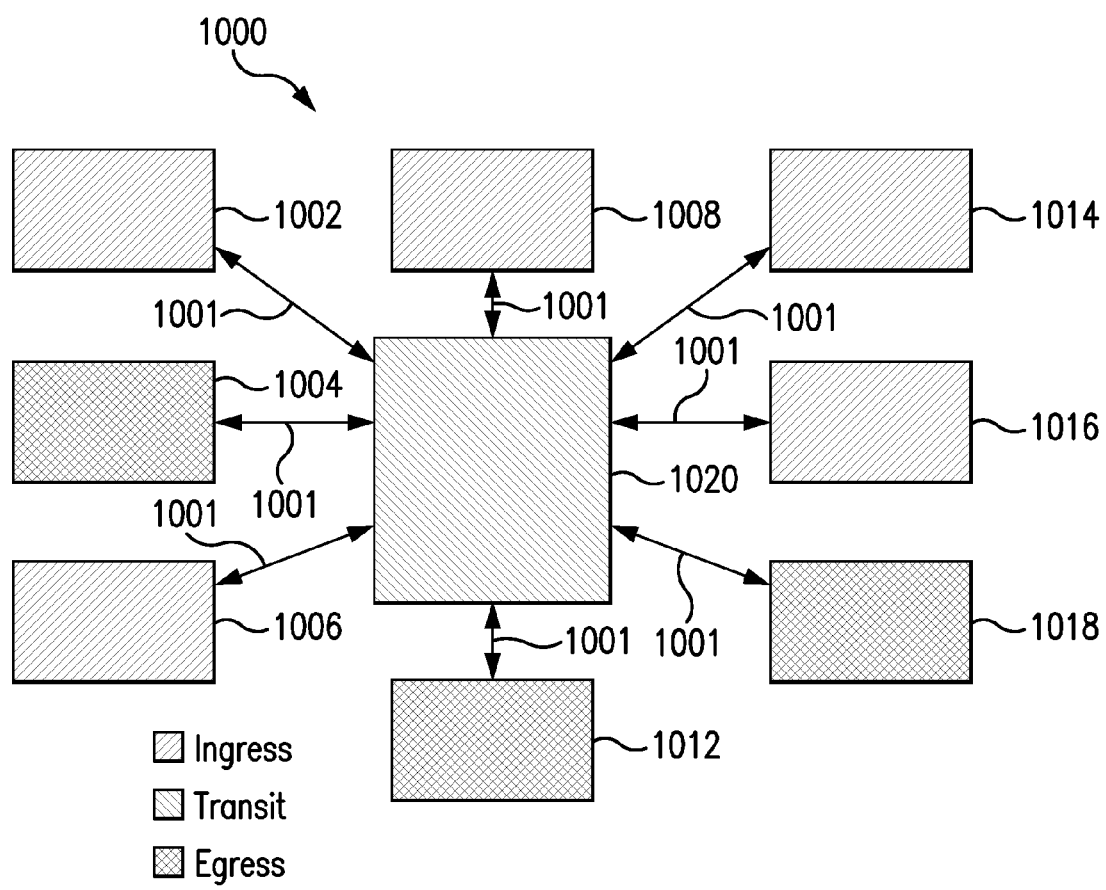

Still continuing with the above example, FIGS. 10C-10E illustrate respectively the cases of the user creating additional filters, namely, a third filter of size 5K for the captured traffic travelling between ingress device 1002 and egress device 1012 (depicted in FIG. 10C), a fourth filter of size 2K for the captured traffic travelling between ingress device 1016 and egress device 1018 (depicted in FIG. 10D) and a fifth filter of size 1K for the captured traffic travelling between ingress device 1014 and egress devices 1004, 1012 and 1018 (depicted in FIG. 10E). For each of these filters optimal routes include large capacity device 1020 as a transit device. It is noted that the filter count operation performed responsive to creation of third-fifth filters would determine that the transit large capacity device 1020 is now using 28K+8*5K+8*2K+8*1K=92K of its 360K filtering capability.

Figure 11A:
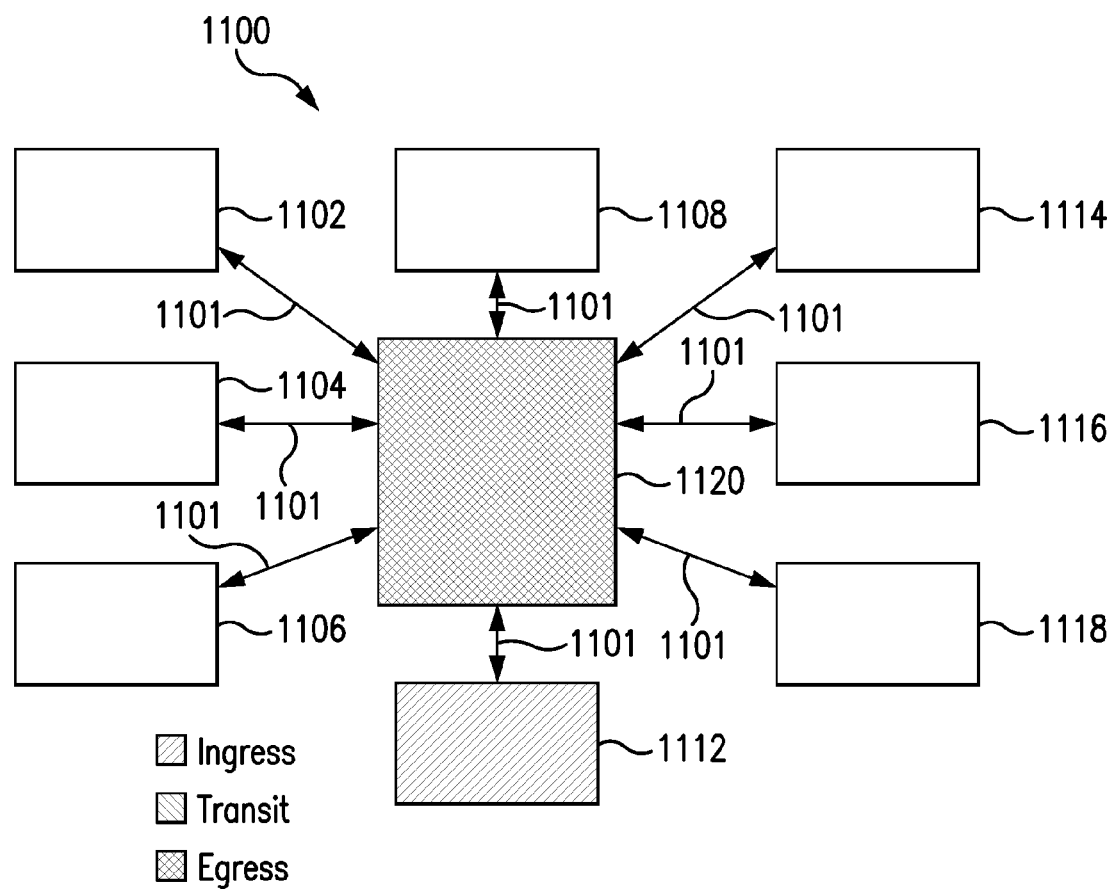
FIGS. 11A and 11B are block diagrams illustrating a filter count operation in a case where a large capacity device acts as an egress device, in accordance with an embodiment of the present invention.
Figure 11B:
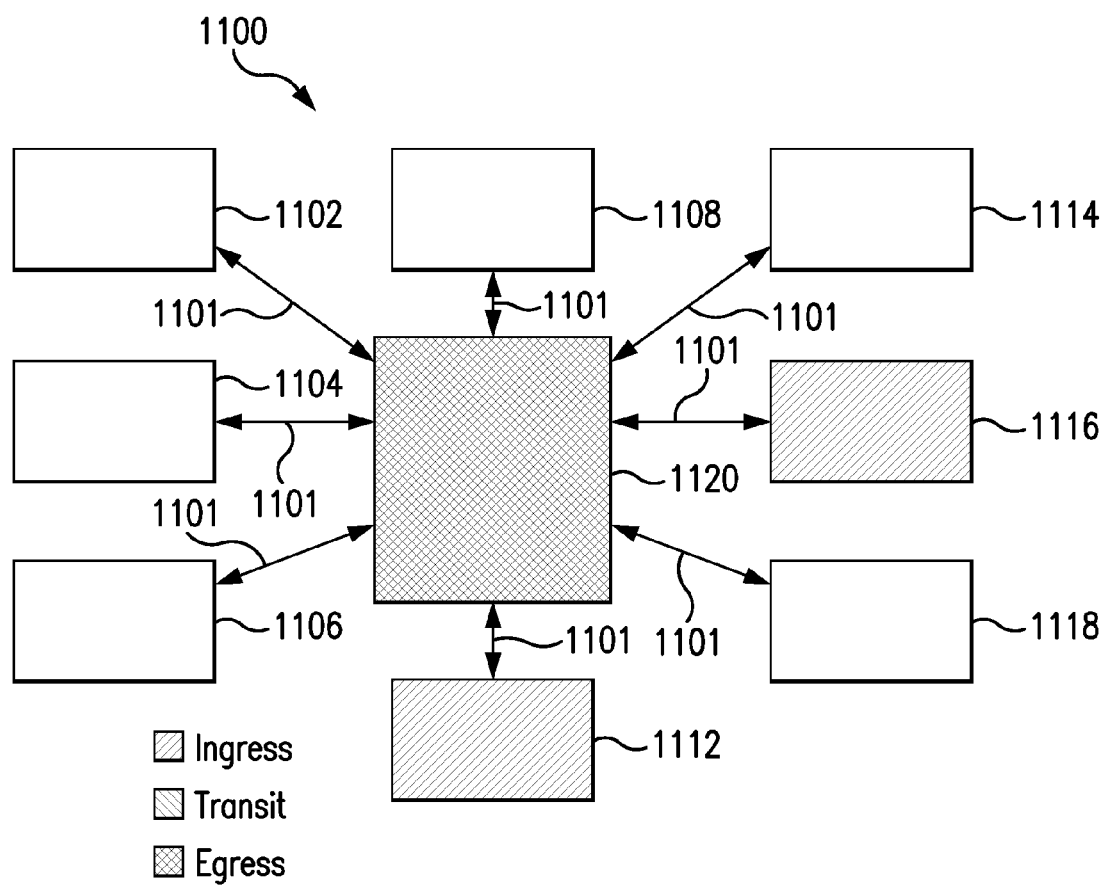

FIGS. 11A and 11B are block diagrams illustrating a filter count operation in a case where a large capacity device acts as an egress device, in accordance with an embodiment of the present invention. Specifically, FIGS. 11A and 11B illustrate an exemplary arrangement 1100 of a plurality of network captured traffic distribution devices 1102-1118 communicatively coupled to a large capacity captured traffic distribution device 1120 via vStack communication links 1101. It is noted that for simplicity of illustration devices 1102-1120 have the same maximum filtering capabilities as devices 902-920 described above in conjunction with FIGS. 9A and 9B. Assume that a user originally creates a 2K filter (e.g., first filter) for packets travelling between devices 1112 and 1120 and then adds another filter of size 1K (e.g., second filter) for packets travelling between devices 1116 and 1120. In these cases, devices 1112 and 1116 represent ingress devices and large capacity device 1120 represents an egress device. The filter count operation performed for the scenario depicted in FIGS. 11A and 11B would determine that ingress device 1112 is using 2K of its corresponding filtering capability of 24K, ingress device 1116 has reached one half of its maximum filtering capability of 2K while the egress large capacity device 1020 is currently using only 8*2K+8*1K=24K of its 360K filtering capability.

Figure 12:
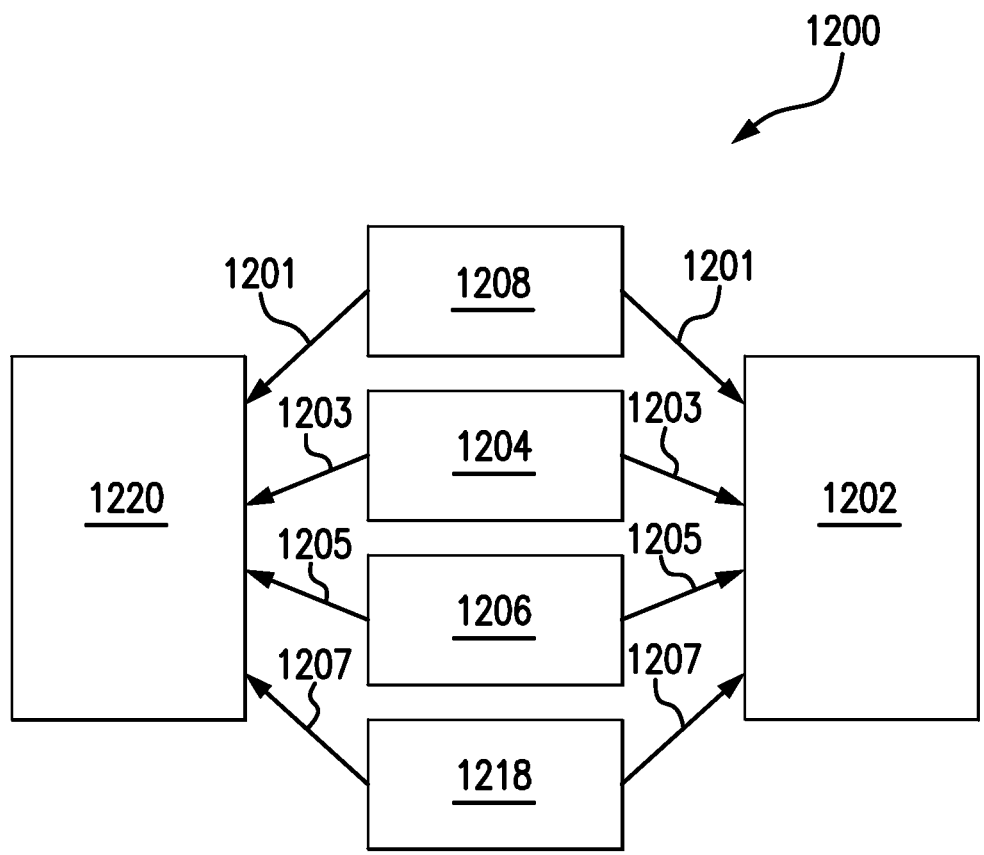
FIG. 12 is a block diagram illustrating a filter count operation in a topology where a plurality of parallel paths exist, in accordance with an embodiment of the present invention.

FIG. 12 is a block diagram illustrating a filter count operation in a topology where a plurality of parallel paths exist, in accordance with an embodiment of the present invention. Specifically, FIG. 12 illustrates an exemplary arrangement 1200 where a plurality of parallel paths 1201, 1203, 1205 and 1207 exist between an ingress large capacity captured traffic distribution device 1220 and an egress device 1202. It is noted that for simplicity of illustration devices 1202, 1204, 1206, 1208, 1218 and 1220 have the same maximum filtering capabilities as corresponding devices described above in conjunction with FIGS. 9A and 9B. In this scenario assume that a user is interested in creating a 6K filter for packets travelling between devices 1220 and 1202. This task can be accomplished by distributing filtering capability among different parallel paths. Specifically, a first filter can be created for a first path 1201, where device 1208 acts as a transit device. Since the filter count operation performed after the creation of the first filter would determine that transit device 1208 has reached its maximum filtering capability of 2K, a second path 1203 may be chosen next as an optimum path for a second 2K filter. Similarly, a third path 1205 can be chosen as an optimum path for a third 2K filter for packets travelling between devices 1220 and 1202, once it is determined that both transit nodes 1208 and 1204 have reached their maximum filtering capacity. This scenario illustrates a novel aspect of the present invention, namely, when a given network topology provides a plurality of alternative paths, once filtering resource capability associated with a particular path is exhausted, advantageously, an alternative (i.e., parallel) path that includes another network captured distribution device capable of fulfilling the filtering requirement can be chosen as an optimum route to the same target destination.

In summary, according to various embodiments of the present invention, the aforementioned filter count operation indicative of filtering resource availability takes into account the following parameters: a number of filters pre-configured by a user, a number of customized filters created by a user, a number of input SPAN ports configured as input ports for a filter on an ingress network captured distribution device and a number of vStack links available on a particular network captured distribution device if that device acts as a transit or egress device. More specifically, for large capacity devices acting as transit and/or egress devices the filter count operation preferably determines a product of a filtering amount associated with the customized filter pre-configured or created by a user, a number of input SPAN ports configured as input ports for that filter on an ingress device and a number of vStack links available on the large capacity device. Process count operation may be executed by, for example, any of the devices and/or systems disclosed herein.

FIG. 13 illustrates an exemplary filter matrix generated for the scenario depicted in FIGS. 10A-10E, in accordance with an embodiment of the present invention. Specifically, filter matrix 1320 corresponds to arrangement 1000 depicted in FIG. 10E. In one embodiment, filter matrix 1320 includes rows and columns. Each entry in filter matrix 1320 is defined by a corresponding row and a corresponding column, and contains information defining currently used 1326 and maximum 1324 filtering capacity for each corresponding device 1322. In one embodiment, filter matrix 1320 may further indicate whether a particular network captured distribution device comprises an ingress, transfer or egress device. The purpose of the filter matrix is to define the filtering capacity information for all devices included in the stacked topology so that an optimum route from the plurality of determined routes can be selected based on the remaining filtering capacity. Thus, if a particular network captured distribution device is unable to fulfil filtering requirement, another route may be chosen which includes another network captured distribution device capable of fulfilling the filtering requirement. The selected optimum route can then be used for transmitting the filtered captured network traffic toward a target destination.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network captured traffic distribution device comprising:
   a plurality of bi-directional ports configured to perform at least one of receiving captured network traffic and echoing received captured network traffic to one or more of the plurality of bi-directional ports;
   a stacking port configured to enable, via a communication link, stacking of the network captured traffic distribution device with at least one additional network captured traffic distribution device in a stacked topology wherein the stacking includes an exchange of configuration information between the network captured traffic distribution device and the at least one additional network captured traffic distribution device, wherein the network captured traffic distribution device comprises a transit network captured distribution device or an egress network traffic distribution device and wherein the configuration information includes instructions regarding a plurality of filters configured or created by a user; and a processor for:
   determining a target destination of a received traffic flow of captured data packets;
   determining a plurality of routes through the stacked topology from the network captured traffic distribution device to the determined target destination;
   determining an amount of available filtering capacity associated with each network captured traffic distribution device along each of the plurality of determined routes by performing a filter count operation, the filter count operation comprising determining a product of a filtering amount associated with the plurality of filters configured or created by the user and a number of input ports available on an ingress network captured traffic distribution device associated with a particular route under consideration from the determined plurality of routes; and
   selecting an optimum route from the plurality of determined routes based on the determined amounts of available filtering capacity.

2. The network captured traffic distribution device of claim 1, wherein the processor is further configured to determine port speeds of all ports associated with each network captured distribution device along each route of the determined plurality of routes and further configured to select the optimum route based on the determined amounts of available filtering capacity and based on the determined port speeds.

3. The network captured traffic distribution device of claim 1, wherein the network captured traffic distribution device comprises a large capacity device communicatively coupled to at least one additional network captured traffic distribution device via at least one stacking link.

4. The network captured traffic distribution device of claim 3, wherein the network captured traffic distribution device comprises a transit network captured distribution device or the network captured traffic distribution device comprises an egress network traffic distribution device and wherein performing the filter count operation comprises determining a product of a filtering amount associated with the plurality of filters configured or created by the user, a number of input ports available on an ingress network captured traffic distribution device associated with a particular route under consideration from the determined plurality of routes and a number of the stacking links associated with the network captured traffic distribution device.

5. The network captured traffic distribution device of claim 1, wherein the processor is further configured to generate a filter matrix based on the performed filter count operation.

6. A computer program product for selecting an optimum route for transmission of a traffic flow of captured data packets, the computer program product comprising:
   one or more computer-readable storage devices and a plurality of program instructions stored on at least one of the one or more computer-readable storage devices, the plurality of program instructions comprising:
   program instructions to exchange configuration information between a network captured traffic distribution device communicatively coupled to a topology of stacked network captured traffic distribution devices and at least one additional network captured traffic distribution device, wherein the network captured traffic distribution device comprises a transit network captured distribution device or an egress network traffic distribution device and wherein the configuration information includes instructions regarding a plurality of filters configured or created by a user;
   program instructions to determine a target destination of a captured traffic flow received by the network captured traffic distribution device;
   program instructions to determine a plurality of routes through the stacked topology from the network captured traffic distribution device to the determined target destination;
   program instructions to determine an amount of available filtering capacity associated with each network captured traffic distribution device along each of the plurality of determined routes by performing a filter count operation, wherein the program instructions to perform the filter count operation comprise program instructions to determine a product of a filtering amount associated with the plurality of filters configured or created by the user and a number of input ports available on an ingress network captured traffic distribution device associated with a particular route under consideration from the determined plurality of routes; and
   program instructions to select an optimum route through the stacked topology from the plurality of determined routes based on the determined amounts of available filtering capacity.

7. The computer program product of claim 6, further comprising program instructions to determine port speeds of all ports associated with each network captured distribution device along each route of the determined plurality of routes, wherein the program instruction to select the optimum route comprise program instructions to select the optimum route based on the determined amounts of available filtering capacity and based on the determined port speeds.

8. The computer program product of claim 6, further comprising program instructions to determine whether at least one of the network captured traffic distribution devices along at least one of the plurality of determined routes comprises a large capacity device communicatively coupled to at least one additional network captured traffic distribution device via at least one stacking link.

9. The computer program product of claim 8, wherein the program instructions to perform the filter count operation comprise program instructions to determine a product of a filtering amount associated with the plurality of filters configured or created by the user, a number of input ports available on an ingress network captured traffic distribution device associated with a particular route under consideration from the determined plurality of routes and a number of the stacking links associated with the large capacity network captured traffic distribution device.

10. The computer program product of claim 6, further comprising program instructions to generate a filter matrix based on the performed filter count operation.

11. A method for selecting an optimum route for transmission of a traffic flow of captured data packets, the method comprising:

exchanging configuration information between a network captured traffic distribution device communicatively coupled to a topology of stacked network captured traffic distribution devices and at least one additional network captured traffic distribution device, wherein the network captured traffic distribution device comprises a transit network captured distribution device or an egress network traffic distribution device and wherein the configuration information includes instructions regarding a plurality of filters configured or created by a user;

receiving, at the network captured traffic distribution device a traffic flow of captured data packets;

determining, by the network captured traffic distribution device, a target destination of the received traffic flow of captured data packets;

determining, by the network captured traffic distribution device, a plurality of routes through the stacked topology from the network captured traffic distribution device to the determined target destination;

determining, by the network captured traffic distribution device, an amount of available filtering capacity associated with each network captured traffic distribution device along each of the plurality of determined routes by performing a filter count operation, wherein the filter count operation comprises determining a product of a filtering amount associated with the plurality of filters configured or created by the user and a number of input ports available on an ingress network captured traffic distribution device associated with a particular route under consideration from the determined plurality of routes; and selecting, by the network captured traffic distribution device, an optimum route from the plurality of determined routes based on the determined amounts of available filtering capacity.

\* \* \* \* \*